US008834265B2

(12) United States Patent
Mathews et al.

(10) Patent No.: US 8,834,265 B2
(45) Date of Patent: *Sep. 16, 2014

(54) CONFIGURABLE AND STAND ALONE VERIFICATION MODULE

(71) Applicant: IGT, Las Vegas, NV (US)

(72) Inventors: Paul D. Mathews, Las Vegas, NV (US); Theodore Y. Cheng, San Francisco, CA (US); Ajit Kumar Sinha, Fremont, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,653

(22) Filed: Jul. 15, 2013

(65) Prior Publication Data

US 2013/0303275 A1 Nov. 14, 2013

Related U.S. Application Data

(63) Continuation of application No. 11/039,065, filed on Jan. 18, 2005, now Pat. No. 8,485,896, which is a continuation of application No. 10/280,895, filed on Oct. 24, 2002, now Pat. No. 6,853,973.

(60) Provisional application No. 60/337,562, filed on Oct. 24, 2001.

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .............................. 463/29; 463/42

(58) Field of Classification Search
USPC ...................................... 463/29, 42
See application file for complete search history.

(56) References Cited

U.S. PATENT DOCUMENTS

| 6,104,815 | A | * | 8/2000 | Alcorn et al. ................ 380/251 |
| 6,160,903 | A | | 12/2000 | Hamid et al. |
| 6,466,917 | B1 | | 10/2002 | Goyal et al. |
| 6,554,705 | B1 | * | 4/2003 | Cumbers ....................... 463/29 |
| 2002/0094869 | A1 | | 7/2002 | Harkham |

FOREIGN PATENT DOCUMENTS

| EP | 1052588 | 11/2000 |
| EP | 1120757 | 8/2001 |
| JP | 200360635 | 2/2003 |

OTHER PUBLICATIONS

Newman P., "Know Your Customers", as published in "World Online Gambling Report", vol. 2, Feb. 2003, at http://www.gamblingcontrol.org/docs/81html., 5 pages.
Unknown author, "Fighting Addiction", Mar. 17, 2003, The Nation (Thailand), 2 pages.
European Office Action dated Mar. 18, 2011 issued in Application No. 02795562.4 (IGT1P394EP).

* cited by examiner

*Primary Examiner* — Kevin Y Kim
(74) *Attorney, Agent, or Firm* — Foley & Lardner LLP

(57) ABSTRACT

A method of configuring a verification system for determining a player's eligibility to participate in online gaming on an online gaming system in a gaming server is described. The method includes adding a new data source provider for performing a verification check, wherein the data source provider provides data to the gaming server to confirm a personal information of the player. The method further includes adjusting a minimum result score needed for the player to pass the verification check based on the new data service provider. The method includes enabling the verification check and the new data source provider for a country where online gaming is allowed. The method further includes receiving, at the gaming server, identification information provided by the player. The method includes determining the player is located in the country. The method further includes performing the verification check.

32 Claims, 11 Drawing Sheets

CONFIGURABLE AND STAND ALONE VERIFICATION MODULE

CROSS-REFERENCE TO RELATED APPLICATIONS

This application is a continuation of and claims priority under 35 U.S.C. Section 120 to U.S. patent application Ser. No. 11/039,065 entitled CONFIGURABLE AND STAND-ALONE VERIFICATION MODULE, which was filed on Jan. 18, 2005, which is a continuation of and claims priority under 35 U.S.C. Section 120 to U.S. patent application Ser. No. 10/280,895 entitled CONFIGURABLE AND STAND-ALONE VERIFICATION MODULE, which was filed on Oct. 24, 2002, which has granted as U.S. Pat. No. 6,853,973, which claims priority to U.S. Provisional Application Ser. No. 60/337,562, filed Oct. 24, 2001. The disclosures of the prior applications are considered part of and are incorporated by reference in the disclosure of this application.

BACKGROUND

The present invention relates to verifying user information in the context of e-commerce.

E-commerce generally relates to business transactions conducted electronically. Examples of e-commerce applications include, for example, on-line banking and on-line gaming. In general, on-line gaming is subject to the laws of the jurisdiction in which players are located. The scope of a jurisdiction generally coincides with the geographical borders of a country but need not do so. Some jurisdictions, such as that of the United States, prohibit its residences to participate in on-line gaming. Other jurisdictions allow participation only if a player is of a certain age. Thus, a player's eligibility often depends on the jurisdiction to which the player is subject.

In addition to ensuring a player's eligibility, proprietors of on-line gaming systems generally also want to ensure that the player is risk worthy, which includes assessing whether the player has good credit and is in good standing with the law and with other gaming proprietors.

On-line gaming systems generally include one or more servers and connections between the servers and a network such as the Internet. The systems also usually include network applications that, for example, provide to players gaming functions and services related to the gaming. The network applications typically reside on the servers.

A player operating a client computer can establish communication with one of the gaming system servers from a point in the network and interact with one of the network applications. Typically, a player can access the gaming applications from any geographic location.

SUMMARY

The present invention provides methods and apparatus, including computer program products, for a configurable verification module. The verification module verities the eligibility of a player to participate in one or more e-commerce applications such as on-line gaming. The verification includes a risk assessment of allowing the player to participate.

In general, in one aspect, a method for verifying a player's eligibility to participate in on-line gaming includes performing one or more verification checks for the player. The method includes, for each verification check, requesting data about the player from one or more data source providers. The method includes receiving the data from the one or more data source providers. The method includes, for each verification check, calculating a check score based on received data from the one or more data source providers. The method includes calculating a verification score that is based on the check scores.

In general, in another aspect, a computer program product, for verifying a player's eligibility for participating in on-line gaming, includes instructions operable to cause a programmable processor to receive information about the player. The product includes instructions to select one or more verification checks that will be performed to verify the player's eligibility. The selection is based on the received information and on configurable criteria. The product can include instructions to determine the order in which the verification checks is to be performed. The determination can be based on the configurable criteria. The product can include instructions to select, for a selected verification check, one or more data sources from which additional information about the player is to be obtained. The selection can be based on the configurable criteria. The product can include instructions to calculate a check score for each verification check. The calculation can be based on the additional information received. The product can include instructions to weight the check scores. The weighting is based on the configurable criteria. The product includes instructions to calculate a verification score. The calculation can be based on the weighted check scores.

The invention can be implemented to realize one or more of the following advantages. The verification module can aggregate information from different data sources, enhancing the ability to accurately verify the eligibility of a player to participate in an e-commerce application such as on-line gaming. Because the verification module acquires data from multiple data sources, the chance of detecting false information is improved.

The verification module can adapt the data from a data source for purposes that are independent of the data source's data format and intended function. For example, the verification module can translate an address received from a data source as a matched or not-matched value, where the match value indicates that the address received from the data source matches an address provided by a user, and where the not-matched value indicates that the address received from the data source does not match the address received from the user.

The verification module can collect information in real time, allowing for rapid and easy verification. For example, the verification module can provide verification results to a user shortly after the user registers with the c-commerce system while the user waits.

The verification module is extremely flexible and, furthermore, configurable based on operator input. The verification module can be customized to meet the requirements of a particular e-commerce system. For example, the threshold for verifying the eligibility of a user seeking participation can be raised or lowered. When a particular e-commerce application involves high stakes, the threshold can be raised. When a particular e-commerce application does not involve high stakes, the threshold can be lowered.

The importance of information from a particular data source cart be varied, advantageously allowing the verification module to accommodate limitations of a particular data source. For example, if a data source has limited capabilities to verify the information of use residing in a certain geographic location, the verification module can be configured to give less weight to data from the data source when verifying users from the geographic location. Consequently, the risk of erroneously rejecting an eligible user because of the limitations of the data source is reduced.

The verification module can process the same data from a data source in different ways. For example, the same data can be used for multiple and different verification checks. For a given verification check, the same data can be used differently for different jurisdictions and countries.

The verification module can be used to facilitate verification for multiple jurisdictions and countries. The verification module can be configured to performed different verification processes for different jurisdictions or countries. The verification module is configurable to ensure compliance with regional regulations, manage risk, and increase revenue by streamlining the process of confirming the validity of player-supplied credentials. The verification processes of the verification module can be fine-tuned. The verification module is stand-alone, and will generally not consume computing resources of an e-commerce system the verification module supports.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 9A-F show examples of a user interface for configuring the verification module.

Like reference numbers and designations in the various drawings indicate like elements.

DETAILED DESCRIPTION

Overview

A configurable verification module operates as a stand-alone component in an e-commerce system. The verification module can be used in conjunction with user registration and user log on.

The verification module receives preliminary information that a user submits at registration. The preliminary information can be submitted to the verification module by, for example, completing a standard form. Using the preliminary information, the verification module accesses data from one or more data source providers ("DSPs"). A DSP can be an on-line application that provides information but need not be so. For example, a DSP can be a bank identification number that is part of a user's credit card number. The verification module uses the data accessed from the DSPs to confirm the user's personal information and evaluate the user's eligibility to participate in one or more e-commerce applications of the system. Evaluation can, for example, include an assessment of whether the user is located in a jurisdiction where the user's participation in a particular e-commerce application is legal, whether the user is located in a jurisdiction where the user is subject to certain local regulations, if the player is of legal age for participation, and if the player provided accurate preliminary information. Evaluation can include determining a user's geographical location, residence, credit card fraud risk, age, and identity. The verification module can express its evaluation as one of three verification actions: approve, reject, and manual verification required.

At log on the verification module can access data and evaluate a player's eligibility for participation. The verification module can express its evaluation as either a pass or a fail. The player is logged on if the evaluation is a pass.

The verification module allows for the introduction of new DSPs and the removal of DSPs already identified. The verification module can be further configured. Configuring as well as adding and removing DSPs are further described below.

Method for Verifying a Player's Eligibility to Participate in an E-Commerce Application Verification includes a series of evaluations, referred to in this specification as verification checks or verification groups ("VGs"), to determine whether a user is eligible to participate. Verification can be applied based on the user's jurisdiction. The verification module can log the data used in each verification check, as well as the evaluation result.

Figure 1:
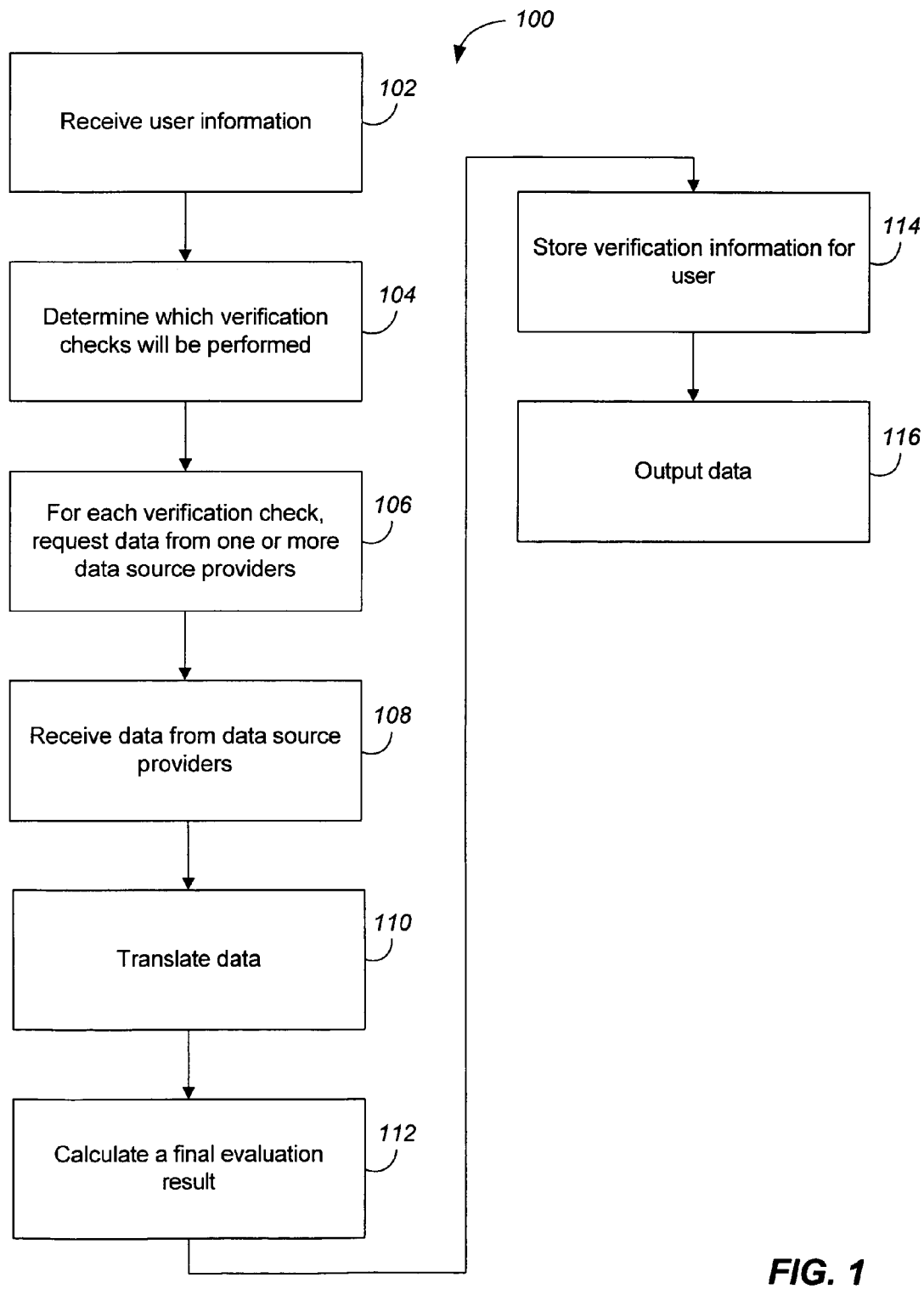
FIG. 1 shows a method for verifying a player's eligibility for participation in on-line gaming.

FIG. 1 shows a method 100 for verifying a user's eligibility to participate in an e-commerce application. As shown, an e-commerce system performing the method 100 receives user information (step 102). As discussed, the information can be received as a standard form that the user completes and submits. The system determines which verification checks will be performed (step 104). The determination can be based on the jurisdiction to which the user is subject, the country in which the user resides, the particular user, or any combination of these factors. For each verification check, the system requests data about the user from one or more DSPs (step 106). The system receives the requested data (step 108). As required, the system can optionally translate the data received from the DSPs (step 110). Alternatively, the system can use the received data without translating the data. The system calculates a final evaluation result (step 112). The calculation is based on the data received from the DSPs. Optionally, the system stores the data used to verify the user and the evaluation result (step 114). Optionally, the system outputs the data (step 116). The system can, for example, output the check scores and the verification scores.

Verifying a Player's Eligibility to Participate in On-Line Gaming

In one implementation, the verification module is part of a gaming system. A player must register with the system to participate in on-line gaming. Registration and verification are different processes. Registration is a process a player initiates when the player completes and submits an on-line registration form. Verification is a process of evaluating the eligibility of a player to participate in on-line gaming.

In one implementation, the verification checks that are used depend on the player's jurisdiction. In one implementation, the verification module determines a player's jurisdiction based on the residence address that the player provided during registration. The verification module can be configured, based on operator input, to use a different verification process for each jurisdiction. An operator can, for example, define jurisdiction, the application verification checks that will be performed, and the scoring for each jurisdiction.

To evaluate a new player, the verification module starts with the information the player provided during registration ("registration information") and performs the verification checks required for the player's jurisdiction. A verification check can include accessing data from one or more DSPs. A DSP provides a result code, which the verification module can translate. Each verification check uses data from the DSPs to produce a check score, which can be weighted. If a player fails a verification check, the player is immediately rejected without proceeding with another verification check. The verification module combines the check scores to calculate a final or verification score. The verification score determines the verification action, which can be approve, reject, or recommend manual verification. In the first case, the player is verified and is eligible for on-line gaming. In the second case, the player is verified but is not eligible for on-line gaming. In the last case, the verification module cannot verify the player with sufficient confidence using the information the verification module received. Manual verification is required before the player is allowed to participate.

To determine a verification action, the verification module compares the verification score to a scoring matrix, in which a range of scores indicates an action. In one implementation, there are three ranges of scores. The highest, middle, and lowest range correspond to an approve, recommend manual verification required, and reject verification action, respectively. Table 1 shows an example of a scoring matrix.

TABLE 1

| Verification action | Verification score |
|---|---|
| Reject | 0-50 |
| Manual verification required | 51-75 |
| Accept | 76-100 |

The following describes DSPs used in verification checks. In implementation described here, the following DSPs are used Quova's™ GeoPoint™ application, Aristotle's™ VerifyME™ application, bank identification numbers that are part of a credit card number, CyberSource's™ Internet Fraud Screen™ application, Experian's™E-identity™ application, and a temporary DSP that is a placeholder to be used when no DSP is available. Alternatively, other DSPs can be used.

Quova's GeoPoint application provides IP address analysis. Given an IP address a player is using to access the Internet, GeoPoint can determine the following information: Physical location (i.e., continent, country, state, city, and postal or zip code), latitude and longitude, connection type (i.e., dial-up, cable, or DSL), interact service provider, and a first and second level domain name.

Aristotle's VerifyME application uses government records to evaluate a player's identity and residence data. VerifyME indicates whether the information provided by the player matches the information describing the player in government records. To protect player information, the verification module and VerifyME can communicate with each other using a secure socket layer protocol.

The first six numbers of a credit card number are referred to as a bank identification number ("BIN"). The system can maintain in, e.g., a database, a list of all applicable BINs, which the verification module can use to evaluate a player's credit card number. Alternatively, the list of BINs can be maintained externally but is accessible to the system. The verification module can, for example, use BINs to determine from which country a credit card was issued.

The CyberSource Internet Fraud Screen ("IFS") system calculates credit card fraud risk based on a player's credit card account number. IFS uses over 150 factors in its scoring calculations to produce a composite risk score. In order to protect the player's credit card information, all information sent to IFS is encrypted prior to be being sent. Encryption can be performed using a public and private key.

Experian calculates a relative risk score taking into account a multitude of factors, including: credit history, voter registration, and address records. Experian is the United Kingdom's largest credit bureau, and provides coverage that it is largely specific to the United Kingdom.

A Temporary DSP can be used when a DSP is not available for a particular country. A Temporary DSP is a placeholder that does not perform any verification, and when used, can send players into the manual verification category.

In one implementation, the verification module performs the verification checks as specified in Table 2. Alternatively, the verification module can use any combination of the verification checks.

TABLE 2

| Check | Registration | Log on |
|---|---|---|
| Face Value | X | |
| Location | X | X |
| Age | X | |
| Residence | X | |
| Financial Institution | X | |
| Risk Check | X | |
| Result | Accept/Reject/ Manual Verification Required | Pass/Fail |

Figure 2:
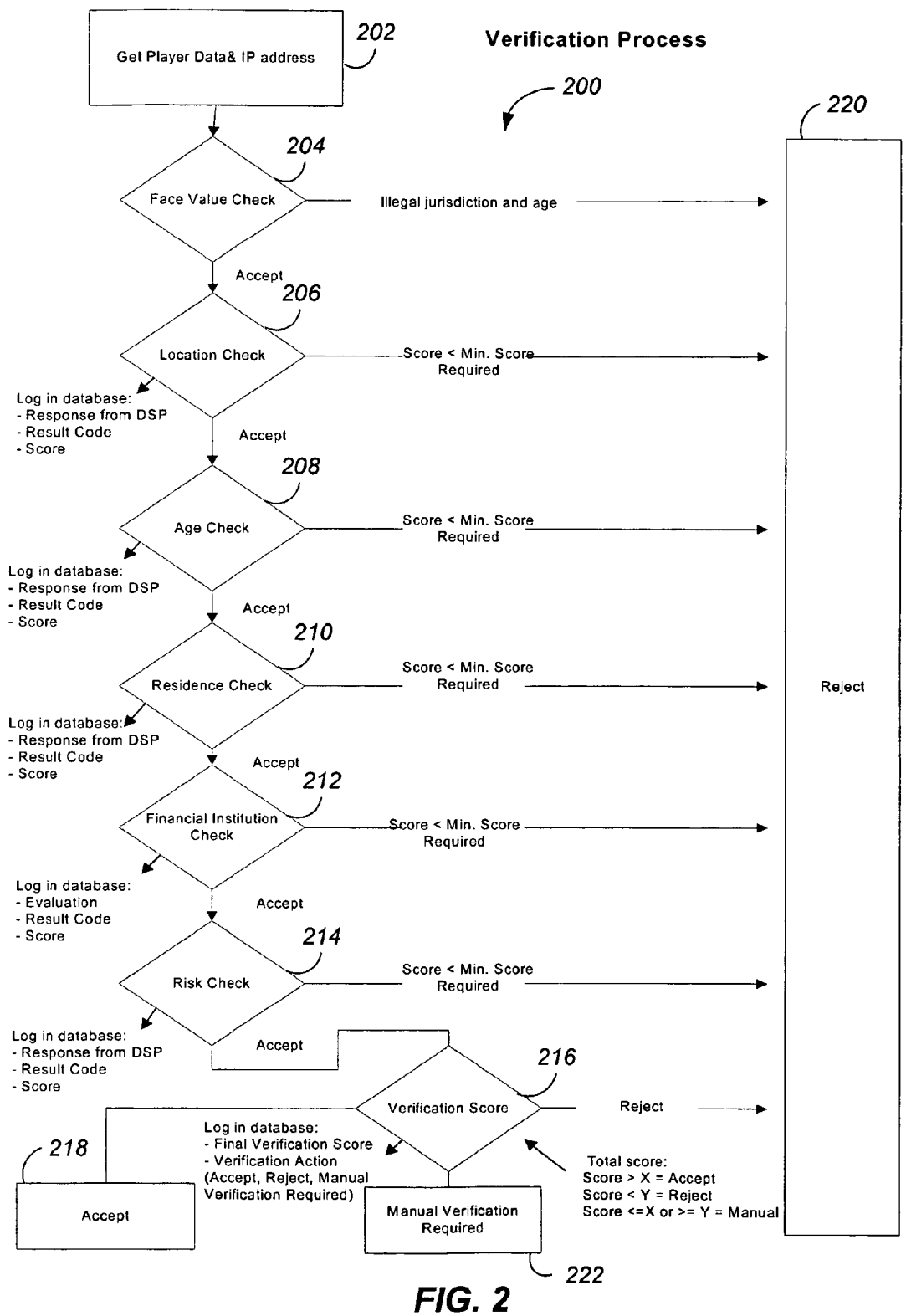
FIG. 2 shows an implementation of the method of FIG. 1.

FIG. 2 shows method 200 that is an implementation of method 100. A player registers and provides the following information: an IP address, a forename, a surname, date of birth, government identification (national identification or driver license), street address and city of residence, postal code, country of residence, credit card number, and credit card expiration month and year. Alternatively, different information can be used. The registration information is stored in a database accessible to the verification module. As shown in FIG. 2, the verification module accesses the database and gets the player's personal information and IP address (step 202). Thereafter, the verification module performs a series of verification checks. For each verification check and depending on the check score produce from the check, the verification module can either approve the player and continue with other verification checks or reject the player and end the verification process. The verification check process is further described below.

The verification module performs a face value check (step 204). The face value check rejects players who indicated at registration that they live in a jurisdiction which prohibits on-line gaming, or players who are younger than the legal gambling age for the jurisdiction indicated by the registration information. The verification module performs a location check (step 206). The location check prevents a player from accessing the system while physically located in a jurisdiction that prohibits on-line gaming. In one implementation, the location check analyzes a player's current IP address to determine the player's current physical location. The verification module performs an age check (step 208). The age check evaluates whether the player is providing an accurate date of birth and name. The verification module performs a residence check (step 210). The residence check evaluates whether the player is providing an accurate residence address. The verification module performs a financial institution check (step 212). The financial institution check evaluates whether the player is using a credit card issued from the player's resident country, and whether the player is accessing the site from the player's country of residence. The verification module performs a credit card fraud check (i.e., risk assessment check) (step 214). The risk check evaluates whether the player is a credit risk or may be involved in fraudulent credit card usage.

The verification module calculates a verification score (step 216). In one implementation, the verification module weights the checks score in accordance with criteria that can be specified by an operator and adds the weighted check scores to calculate a verification score. When the verification score is greater than a first threshold, the verification module recommends a pass verification action (i.e., acceptance) (step 218). When the verification result is less than a second threshold, the verification module recommends a reject verification action (step 220). When the verification score is between the first and second thresholds, the verification module recommends manual verification (step 222). Table 3 shows scoring examples. The verification module can notify a component of the system that registers players of the verification results.

TABLE 3

| Verif. Checks | Check Scores | Weights | Verification Score |
|---|---|---|---|
| Example 1 | | | |
| Location | 65 | 15% | 9.75 |
| Age | 50 | 25% | 12.5 |
| Residence | 75 | 30% | 22.5 |
| Financial Institution | 80 | 10% | 8 |
| Credit Card Fraud | 80 | 20% | 16 |
| Total | | 100% | 69 (Sum is 68.75, however fractional scores above .5 are rounded up) |
| Example 2 | | | |
| Location | 65 | 20% | 13 |
| Age | 50 | 20% | 10 |
| Residence | 75 | 20% | 15 |
| Financial Institution | 80 | 20% | 16 |
| Credit Card Fraud | 80 | 20% | 16 |
| Total | | 100% | 70 |

The following describes the verification checks in detail.

Face Value Check

The data source for this verification check is the country of residence and the date of birth the player specified at registration. The verification module compares the country of residence to a list of jurisdictions where on-line gaining is legal. The system can store the list in the system's database. If the country of residence is not on the list, then the verification module rejects the player. If the country of residence is on the list, then the verification module determines whether the player is of the legal age to gamble in the jurisdiction. If, according to the date of birth specified by the player at registration, the player is of legal gambling age, then the verification module proceeds to performs other verification checks. Otherwise, the verification module rejects the player.

Location Check

The verification module sends the player's IP address to a DSP, such as the GeoPoint is system provided by Quova. The DSP uses the IP address to determine the geographical location of the player's internet service provider ("ISP"). The DSP returns information that includes IP type, continent, country, zip code, connection type (i.e., cable, DSL, or dial-up), and a message that indicates whether the player is using, e.g., AOL as an ISP. The verification module uses the IP type, country, connection type, and the message. The verification module, translates the country and connection type into simplified values for each parameter. Based on the described list of legal jurisdictions maintained in the database, the verification module determines whether the IP address is from a country that permits on-line gaming. Based on the connection type returned from the DSP, the verification module summarized the connection type as either dial-up or non-dial-up.

Table 4 shows an example of data received from GeoPoint, the analyses the verification module performs on the data, and the value to which the verification module maps the received data. The first column describes the name of fields verification module receives. The verification module assigns a result code to the player based on the values. Table 5 shows examples of result codes.

TABLE 4

| Data from GeoPoint | Value Used in Location Check | Based on | Example |
|---|---|---|---|
| IP Type | Mapped/Not Mapped | Data directly from GeoPoint. | GeoPoint returns "mapped", Location Check uses it directly |
| Country | Legal/Illegal | Location Check compares a list of legal online gambling jurisdictions defined in the gaming system database to the country value returned by GeoPoint. | GeoPoint returns "US", Location Check uses internal list of legal online gaming jurisdiction to determine illegal. |
| Connection type | Dial-up/Non Dial-up | Location Check translates connection parameter returned from GeoPoint into Dial-up/Non Dial-up. | GeoPoint returns "cable", Location Check determines non dial-up. |
| Message | AOL/Non-AOL | Message parameter returned from GeoPoint. | GeoPoint returns "AOL", Location check uses AOL directly. |

TABLE 5

| IP Type | Country | Connection | Message | Result Code |
|---|---|---|---|---|
| Mapped | Legal | Non-dialup | Irrelevant | 0001 |
| Mapped | Legal | Dialup | AOL | 0002 |
| Mapped | Legal | Dialup | Non-AOL | 0003 |
| Mapped | Illegal | Non-dialup | Irrelevant | 0004 |
| Mapped | Illegal | Dialup | AOL | 0005 |
| Mapped | Illegal | Dialup | Non-AOL | 0006 |
| Non-Mapped | Irrelevant | Irrelevant | Irrelevant | 0007 |

The following describe the logic behind the result codes of Table 5.

IP Type.

If an IP address is mapped, GeoPoint can determine the physical location of the IF address based on the information in its database. If the IP address is not mapped, GeoPoint cannot determine the IP address's origin, and therefore cannot determine the location of the player's ISP.

Country.

The location check determines whether the player is located in a legal online gaming jurisdiction. As discussed, GeoPoint only returns country information; the verification module uses a list of legal online gaming jurisdictions held in the database to determine whether the country is legal or illegal.

Connection.

GeoPoint maps the physical location of an IF address. When GeoPoint maps a player's IP address, it is actually mapping the location of the server the ISP is using to host the player's Internet access, rather than the actual location of the player's client computer.

The verification module makes the distinction between dial-up and non dial-up Internet connections because it is less likely that a mapped IP address for a dial-up connection provides accurate information describing the physical location of a player. ISPs with dial-up customers often maintain a pool of IP addresses that they randomly assign to their customers. Many ISPs provide 800 numbers to their customers and use servers located throughout their network to host Internet access. If GeoPoint maps an IP address to a specific ISP server, it is difficult to tell the exact location of the player using dial-up access because the IF address may be used by any one of the ISP's customers.

Non dial-up customers need to use a local ISP. ISPs hosting non dial-up customers use local hosting locations rather than accepting national or international customers at a single hosting location.

Message.

America Online ("AOL") is the largest ISP. Unlike many ISPs, AOL has an international presence. If a player is using a dial-up AOL connection, AOL may assign them an IP address mapped to a server in different country. For example, an English AOL customer could receive an IP address that is mapped to a server in France. Because of AOL's international reach, it is more difficult to determine the physical location of a dial-up AOL customer with confidence.

Each result code indicates a different location check score. In one implementation, the highest scores are assigned to legal, no dial-up result codes. The lowest scores are assigned to illegal, non-dial-up result codes.

At registration and log on, the location check score is used to ensure the player meets or exceeds the minimum required score. To verify new players, the location check score is weighted and added into the overall verification score after the verification module completes all verification checks.

Age Check

The goal of the age check is to assess the accuracy of the identity information the player provides during registration. The age check is used to ensure that players do not register using a fictitious name or provide inaccurate information regarding their age. DSPs available for the age check includes Aristotle's VerifyME and Experian.

VerifyME Operation.

The age check sends the following information to VerifyME: first name, last name, date of birth, postal code, country, and government ID (exact form of ID depends on the country where the player resides). VerifyME returns a result code indicating the degree of confidence that the information provided by the player matches the information describing the player in government records.

The age check uses result codes returned directly from VerifyME rather than translating the VerifyME response into an internally defined result code. There are 140 separate result codes that may be returned from VerifyME. Table 6 includes examples of some of the result codes.

TABLE 6

| Result Code | Matching Data |
|---|---|
| 5 | Country Mail Zip/Lastname/Firstname/Suffix/1st 8 Chars of Mail Address/DOB(dd/mm/yyyy) |
| 10 | Country Mail Zip/Lastname/Firstname/Suffix/1st 8 Chars of Mail Address/DOB(mm/yyyy) |
| 15 | Country Mail Zip/Lastname/Firstname/Suffix/1st 8 Chars of Mail Address/DOB(yyyy) |
| 20 | Country Mail Zip/Lastname/Firstname/Suffix/1st 8 Chars of Mail Address/DOB(yyy) |
| 25 | Country Mail Zip/Lastname/Firstname/1st 8 Chars of Mail Address/DOB(dd/mm/yyyy) |
| 29 | Country Mail Zip/Lastname/Firstname/1st 8 Chars of Mail Address/DOB(mm/yyyy)/ID# |
| 30 | Country Mail Zip/Lastname/Firstname/1st 8 Chars of Mail Address/DOB(mm/yyyy) |
| 34 | Country Mail Zip/Lastname/Firstname/1st 8 Chars of Mail Address/DOB(yyyy)/ID # |
| 35 | Country Mail Zip/Lastname/Firstname/1st 8 Chars of Mail Address/DOB(yyyy) |
| 39 | Country Mail Zip/Lastname/Firstname/1st 8 Chars of Mail Address/DOB(yyy)/ID# |
| 40 | Country Mail Zip/Lastname/Firstname/1st 8 Chars of Mail Address/DOB(yyy) |

When VerifyME receives player data it searches its records for combinations of matching data VerifyME may be able to match all of the player's data, or may only be able to match portions of the data. Each result code represents a unique combination of matching player data.

The age check and the residence check both, in one implementation, use VerifyME. The verification module only makes one call to VerifyME, returning one result code. The result codes used in the age check represent VerifyME's combined assessment of a player's identity and residence data.

VerifyME Scoring.

As discussed, the VerifyME result codes indicate a combined age and residence assessment. The verification module separates age and residence verification to allow operators greater control over the verification process. In order to keep age and residence as distinct, separate checks, a different score is used for the same result code in each check. For example, VerifyME returns result code of 85. This result code can indicate a score of 90 in the residence check, but a score of 25 in the age check.

Each result code indicates an age check score. Check scores range from 0 to 100. In one implementation, the highest scores are be assigned to result codes indicating that VerifyME can match a player's first name, last name, date of birth, and government ID data.

Because VerifyME returns a result code that indicates the consistency of both identity and residence data, there are several result codes that represent a "perfect" match on a player's age information. As a result, several response codes may be assigned identical scores.

Experian Operation.

The age check sends the following information to Experian: forename, surname, title (such as Mr. or Mrs.), house name or house number, postal or zip code, address or street address, and city/town. Experian returns a result code indicating the relative accuracy of the intonation supplied by the player.

Experian Result Codes.

Experian result codes indicate two types of results: Relative risk codes indicating a level of authentication that ranges from 20 to 90, and numeric codes within the range of 0 to 20 that indicate player data violates a high risk policy rule. Risk policy rules detect suspicious patterns in player information, such as date of birth mismatch or a credit card that was issued overseas. The result codes returned by Experian are described in the Table 7.

TABLE 7

| Result Code | Description |
| --- | --- |
| R000 | No trace of supplied address. |
| R001 | Reserved for future use - not used in scoring. |
| R002 | BIN number invalid or indicates card issued overseas. |
| R003 | Reserved for future use - not used in scoring. |
| R004 | Current address found on Accommodations address file. |
| R005 | Delivery Address found on the Accommodation Address file. |
| R006 | Reserved for future use - not used in scoring. |
| R007 | Potential "developed" identity. |
| R008 | Unable to verify delivery address. |
| R009 | Office of National Statistics inconsistencies present. |
| R010 | Reserved for future use - not used in scoring. |
| R011 | Reserved for future use - not used in scoring. |
| R012 | Reserved for future use - not used in scoring. |
| R013 | Current address found in Post Office re-directions file. |
| R014 | Reserved for future use - not used in scoring. |
| R015 | Reserved for future use - not used in scoring. |
| R016 | Reserved for future use - not used in scoring. |
| R017 | Reserved for future use - not used in scoring. |
| R018 | Significant application data inconsistencies present. |
| R019 | Reserved for future use - not used in scoring. |
| R020 | Not authenticated - indicates likely fraud, possibly because a risk policy rules has been triggered. |
| R030 | Not authenticated - indicates there is no evidence to locate the individual at the supplied address. |
| R040 | Low level of authentication. |
| R050 | Medium level of authentication. |
| R060 | Medium level of authentication - slighter higher than indicated by 50. |
| R070 | High level of authentication. |
| R080 | Very high level of authentication. |
| R090 | Very high level of authentication - slighter higher than indicated by 80. |

When Experian receives a request from the verification module, Experian compares the player data to several data sources, such as the credit bureau identity information, voter rolls and other public information, and a telephone directory.

Based on the results of the comparison, Experian attempts to determine whether the information provided by the player at registration is accurate. Experian uses several risk policy rules that identify likely cases of fraud. If the information submitted by a player triggers one of Experian's risk policy rules, it returns a result code between 0 and 20. If Experian is able to successfully analyze player information, and no risk policy rules are triggered, it returns a result code between 20 and 90, indicating the relative risk associated with the player.

In one implementation, the verification module uses Experian as a DSP for the age check and residence chock. Only one call to Experian is made, and Experian only returns one result code. The verification module keeps age and residence verification separate to allow operators greater control over the verification process. In order to keep age and residence as distinct and separate checks, a different score is used in each check for the same result code.

Experian Scoring.

Experian returns several result codes (those within the 0-20 range) that indicate the player information triggered a risk policy rule. It may be appropriate to assign all of these results the same score. The Experian result codes within the 20-90 range indicate relative fraud risk with 90 being the most desirable result code. In one implementation, result codes indicating a high level of authentication receives higher scores.

Experian can be used for more than one verification check. Depending on a particular operator's implementation, the analysis indicated by Experian result codes may warrant consistent scoring across all of the checks that use it as a DSP. For example, in contrast to Aristotle result codes, it is probably reasonable to assign the result code of 90 a score of 100 in the age check and Residence Check.

Residence Check

The goal of the residence check is to ensure that the address provided by a player matches the address associated with the player in public and private databases. The residence check assesses the accuracy of the residence address the player provides. DST's available for use with this verification check includes Aristotle's VerifyME and Experian.

VerifyME Operation.

The verification module sends the following information to VerifyME: first name, last name, address, postal or zip code, country, and government ID (exact form of ID depends on country). Only one call is made to VerifyME for both the age check and the residence check.

VerifyME Result Code.

As discussed, VerifyME returns a result code indicating whether the information provided by the player matches the information describing the player in government records. As discussed in the age check section, the residence check uses the result codes returned directly from VerifyME rather than translating the VerifyME response into an internally defined result code.

Scoring.

In one implementation, the highest scores are assigned to result codes indicating that VerifyME could match the player's address data. Because VerifyME returns result codes that indicate the consistency of both age and residence data, there are several result codes that represent a "perfect" match on a player's residence information. As a result, several response codes may be assigned identical scores. Each result code indicates a residence check score. Check scores range from 0 to 100.

Experian Operation.

The Residence Check sends the following information to Experian: forename, surname, title (such as Mr. or Mrs.), house name or house number, postal or zip code, address or street address, and city/town. An operator can choose to use Experian for the age check and residence check. Only one call is made to Experian, returning one result code.

Experian Result Codes.

As discussed, Experian result codes indicate two types of results: Relative risk codes indicating a level of authentication that ranges from 0 to 90, and numeric codes that indicate player data violates a high risk policy rule. Risk policy rules detect suspicious patterns in player information, such as date or birth mismatch or credit card issued overseas.

Experian Scoring.

Experian returns several result codes (e.g., those within the 0-20 range) that would indicate player information triggered a risk policy rule. It may be appropriate to assign all of these results the same score. The Experian result codes within the 20-90 range indicate relative fraud risk with 90 being the most desirable result code. In one implementation, result codes indicating a high level of authentication receive higher scores.

Financial Institution Check

In one implementation, the financial institution check has two goals, verify that the player's credit card number was issued from a bank in a legal online gaining jurisdiction and verify that the player's credit card number was issued from a bank in the same country as the player's residence address, and as the IP address used to access the system.

In one implementation, the financial institution check does not make a call to an external DSP. The financial institution check uses bank identification numbers stored in the system's database and information provided by the location check to perform its evaluation.

Operation.

In one implementation, the financial institution check takes place after the location check because the financial institution check relies on IP address mapping provided by the location check. The financial institution check performs the following steps: (i) identify the country from which a player's credit card was issued, termed the "bank country"; and (ii) compare the bank country to the calling country and home country.

Bank Country Determination.

As discussed, the first six digits of a credit card number are referred to as a BIN. The BIN can be used to determine a player's bank country. The financial institution check compares the bank country to a list of legal jurisdictions maintained in the system's database. Based on this comparison, the check categorizes the bank country as legal or illegal.

Country Comparison.

After the BIN is evaluated to determine a bank country, the financial institution check compares the bank country against the player's home country (as stated at registration), and the determination made by the location check on whether the country (i.e., the calling country) is one that permits on-line gambling.

The financial institution check represents the consistency and legality of these countries as a result code. Table 8 describes the results codes used in the financial institution check. The home country/bank country/calling country comparison is not performed if the home country is a country that prohibits on-line gambling (i.e., an illegal country). If players indicate that they live in a country that prohibits on-line gambling, the financial institution check can determine the result code without performing the comparison.

TABLE 8

| Home country | Bank Country | Calling Country | Result Code |
| --- | --- | --- | --- |
| Illegal | Irrelevant | Irrelevant | 0000 |
| Legal | Same/Legal | Same/Legal | 0001 |
| Legal | Same/Legal | Different/Legal | 0002 |

TABLE 8-continued

| Home country | Bank Country | Calling Country | Result Code |
| --- | --- | --- | --- |
| Legal | Same/Legal | Different/Illegal | 0003 |
| Legal | Different/Legal | Same/Legal | 0004 |
| Legal | Different/Illegal | Same/Legal | 0005 |
| Legal | Different/Legal | Different/Legal | 0006 |
| Legal | Different/Legal | Different/Illegal | 0007 |
| Legal | Different/Illegal | Different/Legal | 0008 |
| Legal | Different/Illegal | Different/Illegal | 0009 |
| Legal | Different/Legal | Unknown | 0010 |
| Legal | Different/Illegal | Unknown | 0011 |
| Legal | Same/Legal | Unknown | 0012 |
| Irrelevant | Unknown | Irrelevant | 0013 |

Scoring.

Each result code indicates a different financial institution check score. Check scores range from 0 to 100. The financial institution check score is used to ensure the player meets or exceeds the minimum required score. The financial institution check score is weighted and added into the overall verification score after the verification module completes its verification checks.

In the implementation described, the location check is used before the financial institution check. The financial institution check relies on the IP address mapping performed by the location check.

Risk Check

The goal of the Risk Check is to evaluate the risk that a player may be involved in fraudulent credit card activities. Suspicious or fraudulent credit card usage may indicate that an identity theft has occurred.

CyberSource Internet Fraud Screen ("IFS") is a data source the verification module can access in performing this verification check. The verification module sends WS the following information describing a player: first name, last name, e-mail address, street number from the player's residence address, country, credit card number, credit card expiration month, and credit card expiration year. IFS evaluates the credit risk involved with a credit card purchase. In order to prompt an IFS evaluation, the verification module performs a credit card purchase of $0.

IFS returns one of two types of information to the verification module: risk scores and invalid card message. IFS returns either the risk score or the invalid card message, never both. If IFS is able to successfully evaluate the information sent by the verification module, IFS returns a risk score. IFS risk scores indicate relative fraud risk using a 0 to 99 scale. IFS uses, a risk scoring system where a score of 0 indicates the lowest risk and a score of 99 indicate the highest relative risk. In one implementation, this scoring system is the exact opposite of that used by the verification module, in which 100 is the most desirable score. The verification module assigns a result code to each risk score returned by the IFS. By us ng a verification module administrative interface to assign a score to each result code, the response received from the IFS can be translated into a score appropriate for use in the verification module's scoring system.

If IFS determines that the player's card account is invalid, it cannot return a risk Score. Instead, IFS returns an invalid card message. The verification module interprets both risk scores and the invalid card message as result codes. Table 9 provides some examples of result codes of the risk check.

TABLE 9

| Result Code | Description |
| --- | --- |
| R001 | Invalid card number |
| R100 | Risk score = 0 |
| R101 | Risk score = 1 |
| R102 | Risk score = 2 |
| R103 | Risk score = 3 |
| R104 | Risk score = 4 |
| R105 | Risk score = 5 |
| R106 | Risk score = 6 |
| R107 | Risk score = 7 |
| R108 | Risk score = 8 |
| R109 | Risk score = 9 |
| R110 | Risk score = 10 |
| R111 | Risk score = 11 |
| R112 | Risk score = 12 |
| Many more result codes (R113-R199) | Risk scores = 113 through 199 |

IFS Scoring.

Check scores for the risk check range from 0 to 99. In one implementation, the tower the risk score returned by the IFS, the higher the score assigned to the corresponding result code should be.

DSP Usage

Each DSP uses its own set of data to perform player verification. In many cases, the data set a DSP uses allows the DSP to perform player verification in a specific group of countries, but does not allow the DSP to verify player's registering from other countries. To ensure that all players are adequately verified prior to registration, DSPs are selected for verification checks on a region-by-region basis (e.g. country-by-country). Only DSPs that have adequate coverage for a given region may be used for that region.

In one implementation, all countries within a given jurisdiction use the same verification checks. However, because DSPs are assigned on a region-by-region basis, the same checks may use different DSPs in each country within the same jurisdiction. If there is no DSP that provides coverage for a country for a particular verification check, then the Temporary DSP can be used.

The temporary DSP is a placeholder DSP. It does not perform any verification or provide any information to the verification process. The temporary DSP serves to allow the use of a check in a jurisdiction, even though there may be no DSPs to support that check in one or more of the countries within the jurisdiction.

When a temporary DSP is used for a check, players are given the minimum required score for that check so that they are not rejected. If a temporary DSP is used for any check, after all checks are performed, the player is always sent into the manual verification required category, regardless of the final verification score. When a temporary DSP is used, a player may still be rejected if they do not obtain the minimum required score on any of the other checks. Temporary DSP can be limited for use on performing the age check, residence check, and risk check.

Verification Check Methodology

As discussed, the purpose of each verification check is to produce a check score. Each check can call one or more DSPs to obtain data. DSPs have and are called in an order of priority. The priority order can be configured by an operator.

After receiving data from the first DSP, the verification module can either perform internal logic to translate the data into pre-defined result codes. Alternatively, the verification module can use the result code returned from the DSP. The verification module maps each result code to a check score.

In one implementation, if the check score meets a minimum required score for the current verification check, then the verification module passes the player for the current verification check and the next DSP associated with the verification check is not called.

In one implementation, for each verification check, the largest DSP score for the verification check is compared to a first threshold, which must be met or exceed to accept data from a DSP. If the current score does not satisfy the first threshold, then the next highest priority DSP in the current verification check is called. If any additional DSPs are called, the comparison is run again, until a DSP is found that returns a current score that satisfies the first threshold. After all DSPs are called or the first threshold is met or exceeded, then the largest score is compared to a second threshold, which must be exceed to pass the current verification check. If the second threshold is exceed, then the value for the current verification check is accepted. Otherwise, the verification process stops.

Figure 3:
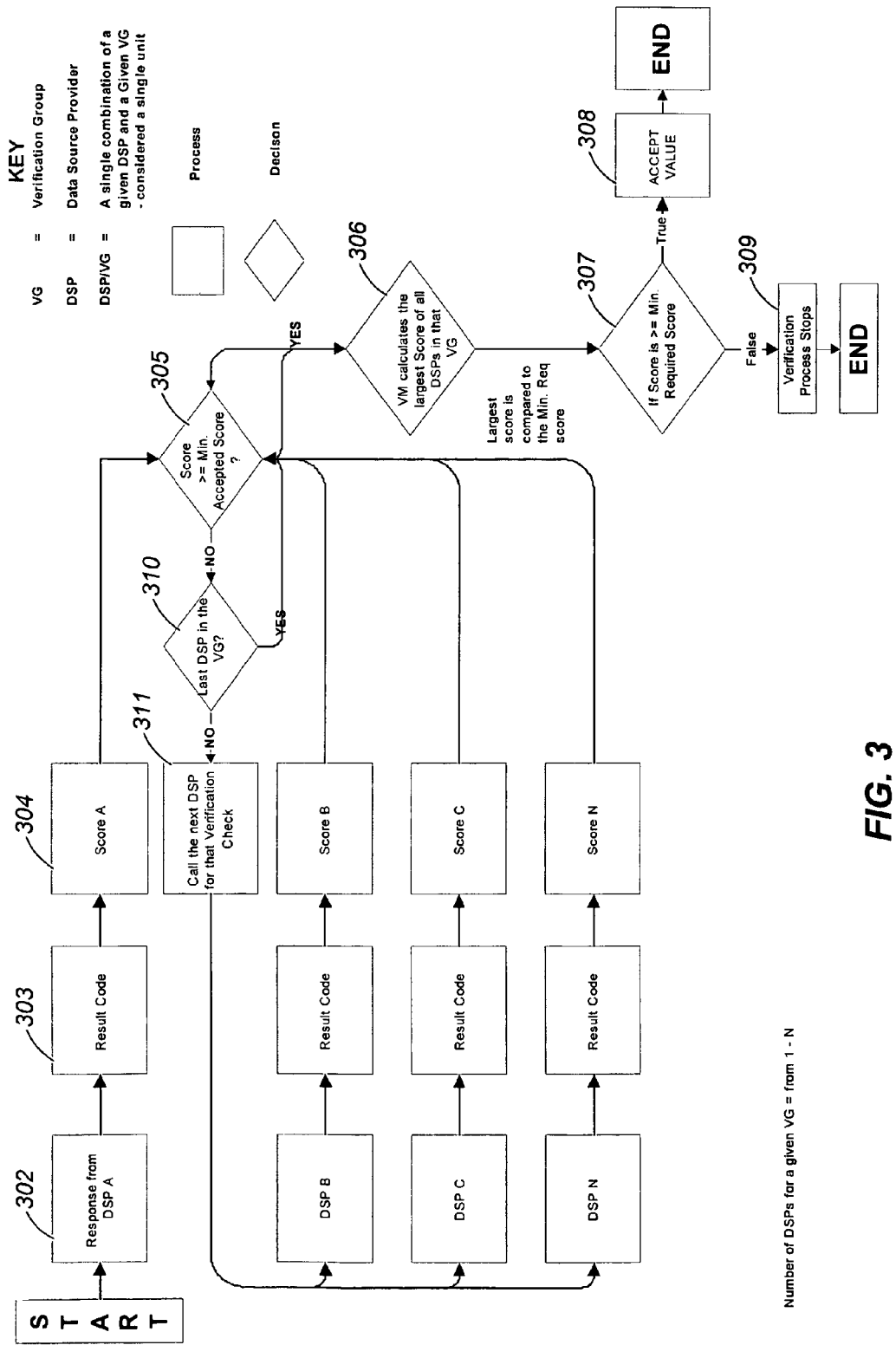
FIG. 3 shows a method for performing a verification check.

FIG. 3 shows an example method 300 for performing a verification check as described above. As shown, the verification module receives a response from DSP A, which is the DSP with the highest priority that has not been called prior to the current call for the current verification check (step 302). The verification module either extracts a result code directly from the DSP's response or translates data from the response into a result code (step 303). The verification module determines a score from the result code (step 304). The verification module determines if the score is greater or equal to a minimum score accepted (decision step 305). The minimum score accepted is defined as the score that must be met or exceeded in order for a result from a DSP to be considered for verification without having to call another DSP. If the score is greater than or equal to the minimum score accepted, then the verification module calculates the largest score so far derived from all DSP responses that have been received in the current verification check (step 306). The verification module checks if the largest score calculated is greater than the minimum score required (step 307). The minimum required score is defined as the score that that must be met or surpassed for a given verification check for the player to pass the check. If yes, then the player passes the current verification check, and the verification module accepts the value of the score and proceeds to a next verification check (step 308). If no, then the verification module stops the verification process (step 309).

If, in decision step 305, the verification module determines that the score derived from the current DSP is not greater than or equal to the minimum score accepted, then the verification module determines whether the DSP is the last DSP available for the current verification check (step 310). If yes, then the verification module proceeds to step 306. Otherwise, the verification module calls the next DSP (step 311) and repeats the steps described above until there are no more DSPs.

Logon to an On-Line Gaming System

Figure 4:
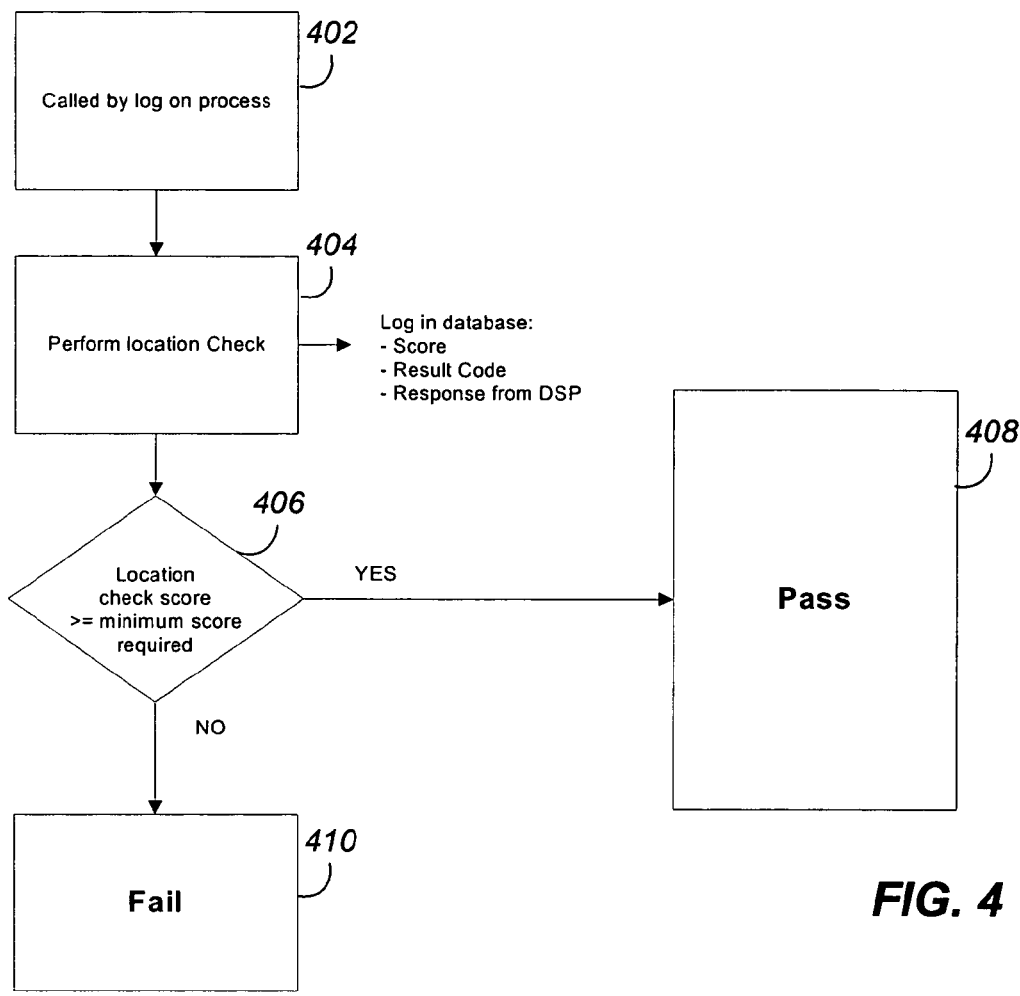
FIG. 4 shows a method for logging on a player.

The verification module an be used in conjunction with a log on process. The verification module verifies that a player seeking to use the gaming system is currently physically located in a jurisdiction that allows on-line gaming. FIG. 4 shows an example method for logging on a player. The verification module is called by a log on process (step 402). The verification module performs a location check to obtain a location check score (step 404). The verification module determines whether the location check score exceeds a minimum score required (step 406). If yes, then the player is allowed to access the system (i.e., the module returns a pass to the log on process) (step 408). Otherwise, the player is not allowed access to the system (i.e., the verification module returns a fail to the log on process) (step 410).

Configuring the Verification Module

As discussed, the verification module can be configured. The verification module includes criteria that determines, for example, the scoring. The criteria, which can be based on operator input, can specify the weight factors for a verification check.

The verification module can receive a weighting from, e.g., an operator, for each verification check to determine the importance of each verification check in the overall verification score. In one implementation, the weights of all verification checks add up to one hundred percent. Table 3 above depicts examples of weighting.

The criteria can also specify relationships between or among DSPs, verification checks (also referred to as verification groups), jurisdictions, and countries. A DSP can be assigned (or added) to a verification check so that the DSP is called during the check. The DSP/verification check combination can be assigned to a region (e.g., a country). Furthermore, a verification check can be assigned to a jurisdiction, and a country can be assigned to a jurisdiction. Conversely, any assignment can be negated.

In one implementation, the verification module includes an administrative tool and provides a user-friendly and web-based interface implemented as JSP/EJB-driven HTML pages. Pages of the interface can be served using a secured socket layer ("SSL").

The administration tool allows an operator to define and implement business rules and internal control procedures to manage risk. Using the administration tool, the operator can change which DSPs are used to change the breadth of coverage, define how the data is interpreted, and adjust the scoring algorithm to either increase or decrease the level of acceptable risk.

The administrative tool allows art operator to configure how the verification module works. In one implementation, the verification module requires minimal intervention on the part of the operator, because the values for operator-configurable fields are pre-populated with default values.

The interface provides access to configurable fields, which define values such as what countries belong to a certain jurisdiction, and what the minimum required score should be for a particular check. These values are used in the calculations performed during the verification process. There are two primary categories of tasks for configuring the verification module. These are assign tasks and score tasks.

Assign tasks define relationships of the DSPs, verification checks, jurisdiction, and countries. Assign tasks allows an operator to alter relationships between entities that have already been entered into the verification module. Assign tasks focus on altering the relationships between geographical grouping components (e.g., countries and sub-countries) and logical grouping components (e.g., jurisdiction ID's and verification checks), and how they interact with the verification checks (and the DSPs in assigned to the verification checks).

Score tasks quantify the nature of the relationships set up with the assign tasks. Score tasks allows an operator to configure the values that determine the results from various DSPs and determine the criteria for verification. Score tasks also permit the operator to fine-tune the system by adjusting values such as the minimum score required, minimum score accepted, and DSP priority. For example, score tasks allows an operator to activate or deactivate DSPs for use in a verification check, country, jurisdiction, or any combination of these. For example, a DSP is upgrading its database in the United Kingdom. As a result of the upgrade, the DSP will not be available for two months in that country. In this case, the operator can temporarily deactivate (i.e., de-select) this DSP, and then reactivate (i.e., select) the DSP when the DSP is available again. Table 10 shows examples of the assign and score tasks.

TABLE 10

| Administrative Tasks - Managing . . . | Example |
| --- | --- |
| Assign Tasks | |
| Managing Relationships between a Data Source Provider and a Verification Group | — |
| Assigning a Data Source Provider to a Verification Group | Assign the DSP Quova ™ to the Age VG. |
| Removing a Data Source Provider from a Verification Group | Remove the DSP Quova to the Age VG. |
| Managing Relationships between a Data Source Provider/Verification Group and a Country | — |
| Assigning a Country to a Data Source Provider/Verification Group Combination | Assign the VG - Age/DSP-Quova combination to the United Kingdom. |
| Removing a Country from a Data Source Provider/Verification Group Combination | Remove the country United Kingdom from the VG - Age/DSP-Quova combination. |
| Managing Relationships between a Verification Group and a Jurisdiction ID | — |
| Assigning a Verification Group to a Country | Assigning the VGs Age, Financial, and Location to the Country - United Kingdom. |
| Removing a Verification Group from a Country | Removing the VGs Age, Financial, and Location VGs from the Country-United Kingdom. |
| Managing Relationships between a Country and a Jurisdiction ID | — |
| Assigning a Country to a Jurisdiction ID | Assign the country China, to the Jurisdiction ID Asia. |
| Removing a Country from a Jurisdiction ID | Remove the country China, from the Jurisdiction ID Asia. |
| Assigning a Priority to a DSP within a Verification Group | Assigning the priority of 1 to the DSP Aristotle for the Location Verification Group for a given Country. |

TABLE 10-continued

| Administrative Tasks - Managing . . . | Example |
|---|---|
| Selecting whether a DSP is called in a Verification Group | Quova is called (or not called) in the Location Verification Group for a given Country |
| Score Tasks | |
| Fine-Tuning a Score Mapped to a DSP Result Code | Maps a Result Code to a Score that is meaningful to the Administrator. |
| Assigning Weight to each Verification Group | Location - 60%, Financial - 40%. |
| Defining the Min. Score Required for a Given Verification Group | Designating the value 18 for the Location Check. |
| Defining the Min. Score Accepted for a Given Verification Group | Designating the value 45 for the Location Check. |
| DSP Score Process Diagram | A diagram depicting the DSP Score Process. |
| Designating a Verification Check Priority No. | Set the priority to 1 for the DSP Quova in the Verification Group, Location. |
| Configuring the Verification Score Matrix | Reject - 35. Manual verification required - 65. Accept - 100. |

The following describes examples of assign tasks. As discussed, a DSP can be a third-party vendor that performs a particular type of verification check. To provide redundancy, it is likely that there will be more than one DSP serving a given verification check. DSPs are assigned to the verification check, and together they form a unique DSP/verification check (or "DSP/VG") combination. This combination, logically considered to be a single unit, will then be used in subsequent assign tasks.

Figure 5:
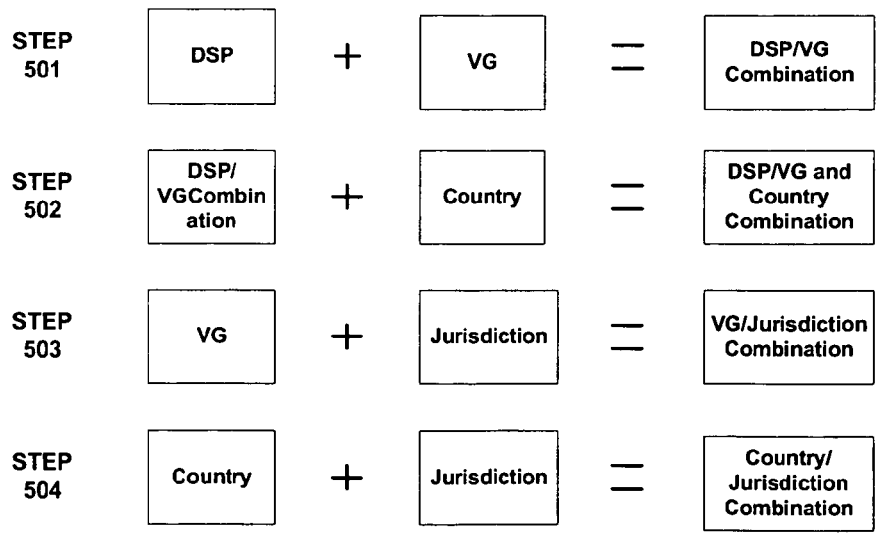
FIG. 5 shows a method for configuring a verification module.

In general, a DSP can be assigned to or removed from a particular verification check. A country can be assigned to or removed to a DSP/VG combination. A verification check can be assigned to or removed from a jurisdiction. A country can be assigned to or removed from a jurisdiction. FIG. 5 shows one example process for establishing relationships to configure the verification module. A DSP is assigned to a verification check (step 501). That is, the DSP is enabled for the verification check. The DSP and verification check combination defined in step 1 is then assigned to a country (step 502). The verification check is assigned to a jurisdiction (step 503). The country is assigned to a jurisdiction (step 504). Steps 503 and 504 are interchangeable.

The relationships between verification checks and jurisdictions can be changed. Jurisdictions are logical groupings of countries/sub-countries that usually have the same, or similar gaming regulations. Jurisdictions also provide a convenient way to administer multiple countries (e.g., their member countries) simultaneously. The verification module allows an operator to configure what mix of verification checks will be used for a given jurisdiction. Regulatory requirements are likely to differ from jurisdiction to jurisdiction. It may be necessary to perform all of the verification checks (location, age, residence, risk, financial institution), or it may only be necessary to perform a subset. The verification module allows an operator to define which verification checks are used in each jurisdiction.

The verification module allows an operator to define relationships between a country and a jurisdiction. As discussed, a jurisdiction can be a logical grouping of countries/sub-countries that have member countries with the same or similar gaming regulations.

An example of when an operator might wart to add a country to a jurisdiction is when a country has just legalized on-line gaming. The operator would probably want to increase their potential customer base, and add the country to an appropriate jurisdiction that contains countries with similar online gaming regulations. This unique mix of gaming regulations combined with what verification checks are required will determine into which jurisdiction to place the new country. The verification module also allows an operator to adjust the list of countries that are assigned to a jurisdiction.

Multiple DSPs can be assigned to a given verification chock for redundancy to provide, for example, fault tolerance. When there are multiple DSPs assigned to a verification check, the order in which the DSPs will be called during the verification check can be defined.

Figure 6:
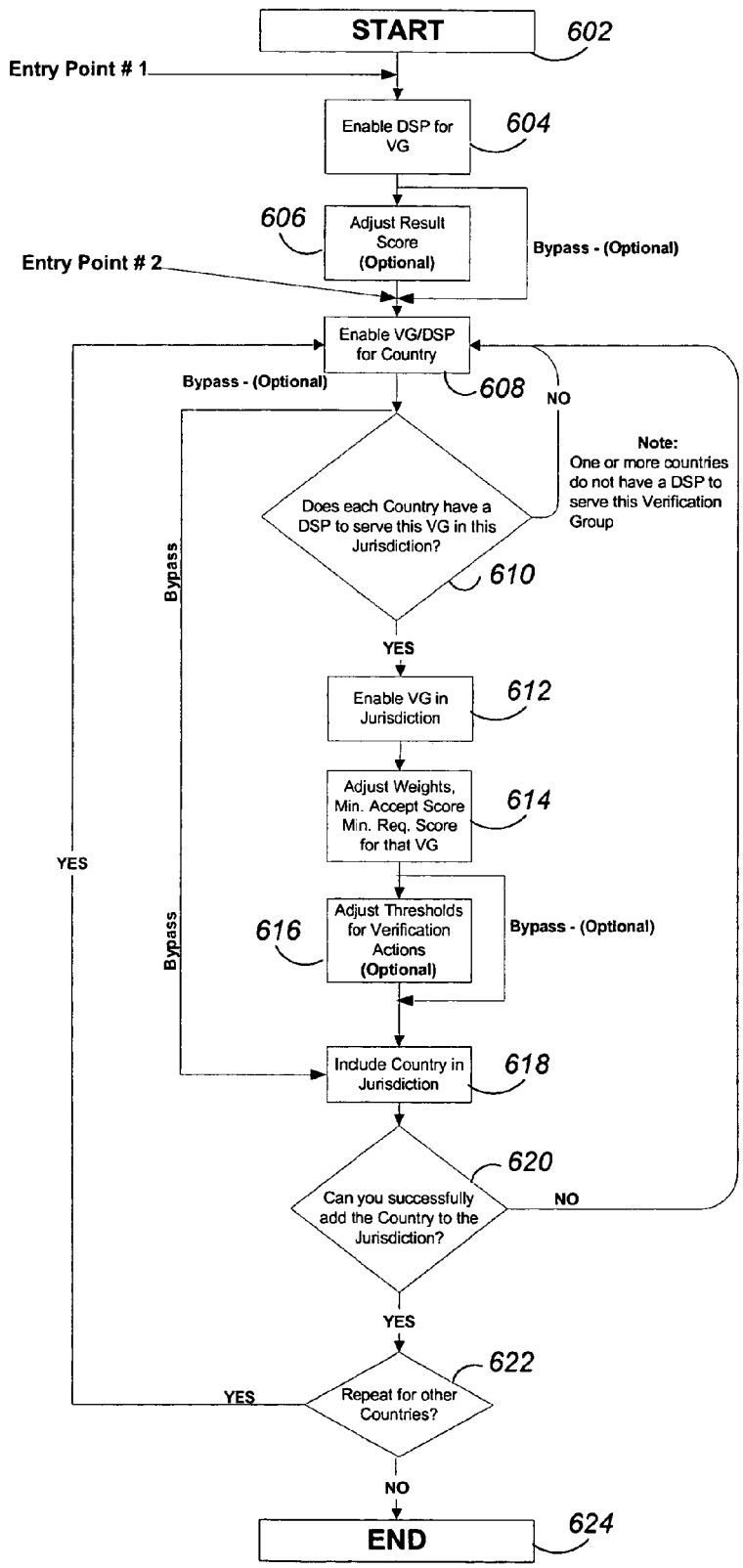
FIG. 6 shows a method for adding either a data source provider, a verification check, a country, or a jurisdiction.

FIG. 6 is a flowchart showing a process 600 for adding one or more of a DSP, a verification check (i.e., verification group or VG), a country, and a jurisdiction. As can be seen in the flowchart, there are two different entry points. The first entry point, Entry Point #1, is located between steps 602 and 604 and is used when a DSP is to be enabled for a verification check. The second entry point, Entry Point #2, is located between steps 606 and 605 and is used when a single combination of a given DSP and a given verification check is to be enabled for a particular country, or when a country is to be included into a jurisdiction.

When a DSP is to be enabled for a verification check, the process starts by enabling the DSP for the verification check (step 604). If it is determined to be necessary, the process adjusts the result score (step 606), but if no adjustment has to be made, the process continues by enabling the DSP/VG combination (which from this point and onward is treated as a single unit) for the selected country (step 608). As can be seen in FIG. 6, step 608 is also the first step that takes place if there already is a DSP/VG combination in place that is to be enabled for a particular country. The process can then, for example, based on user input, decide whether accepted score, required score, and so on should be adjusted for that verification check. If no particular adjustments need to be made, then the process bypasses steps 610-616 and proceeds directly to step 618, where the country is included in the jurisdiction, which will be further explained below.

If the values need to be adjusted, the process continues to step 610, where it checks whether each country in the jurisdiction has a DSP to serve the verification check. If there is no DSP to serve the verification check, the process returns to step 608 and takes the bypass route to step 618, as discussed above. However, if there is a DSP that can serve the verification check, the process continues by enabling the verification check within the jurisdiction (step 612). The process then adjusts the weights, the minimum accepted score, and the minimum required score for that verification check (step 614). Optionally, the threshold values for verification actions can also be adjusted (step 616), but if this is not necessary or desired, the process continues directly to step 618, and attempts to include the country in the jurisdiction.

The process then checks if the attempt to add the country to the jurisdiction was successful (step 620). If the attempt was not successful, the process returns to step 608 and continues as described above. If the country was successfully included into the jurisdiction, the process moves on to step 622, where it investigates whether there are any other countries that should be included. If more countries are to be included, then the process returns to step 608, where a VG/DSP combination is enabled for a different country. If no more countries are to be included, the adding process ends (step 624).

Figure 7:
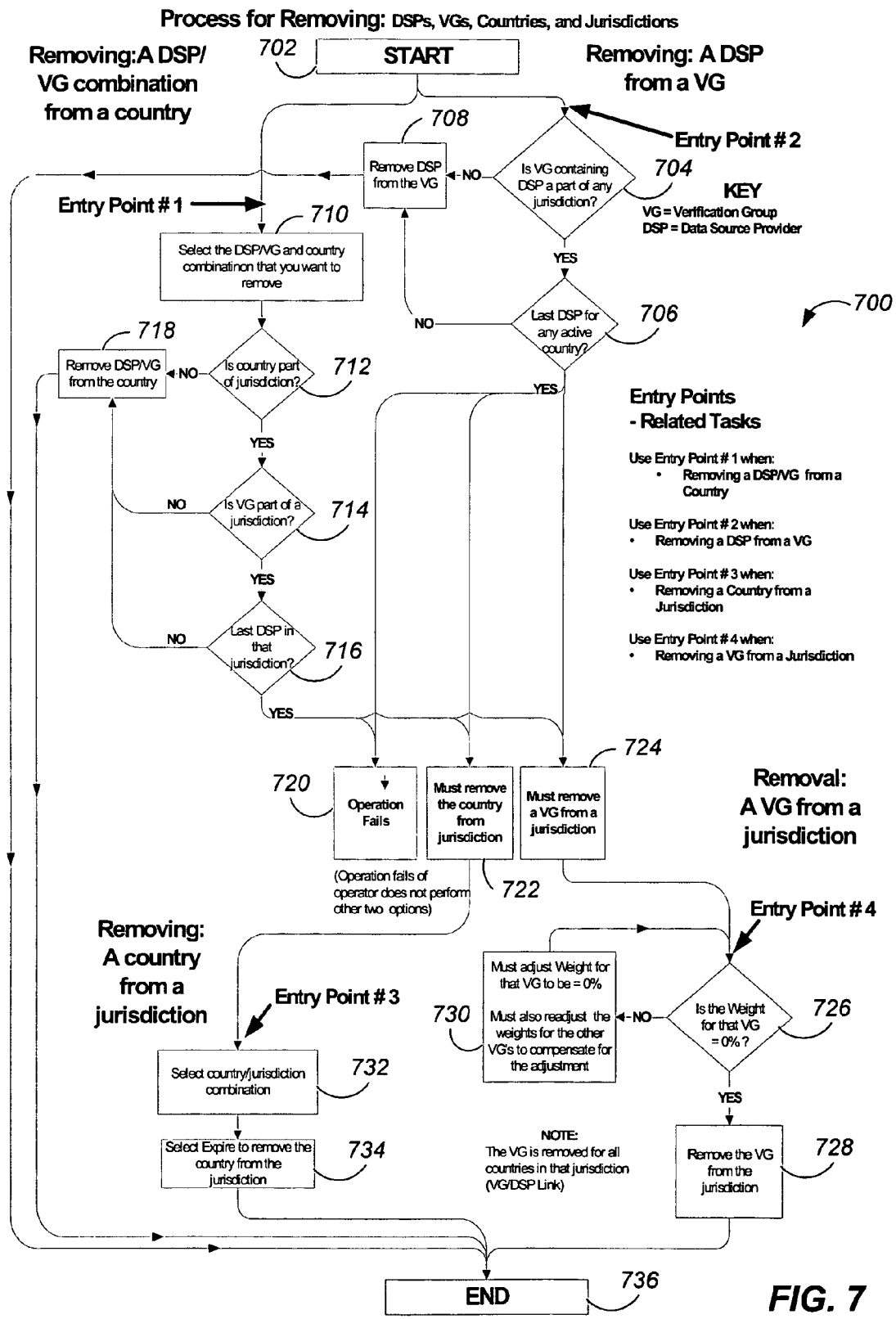
FIG. 7 shows a method for removing either a data source provider, a verification check, a country, or a jurisdiction.

FIG. 7 is a flowchart showing a process 700 for removing one or more of a DSP, a verification check (i.e., verification group or VG), a country, and a jurisdiction. As can be seen in the flowchart, there are four different entry points. The first entry point, Entry Point #1, is located just before step 710 and is used when a DSP/VG combination is to be removed from a country. The second entry point, Entry Point #2, is located just before step 704 and is used when a DSP is to be removed from a verification check. The third entry point, Entry Point #3, is located just before step 732 and is used when a country is to be removed from a jurisdiction. Finally, the fourth entry point, Entry Point #4, is located just before step 726 and is used when a verification check is to be removed from a jurisdiction. Each of these scenarios will now be described.

When a DSP/VG combination is to be removed from a country the process starts by selecting the DSP/VG and country combination, that is to be removed (step 710). It then checks whether the country is part of a jurisdiction, (step 712). If the country is not part of a jurisdiction, the process moves to step 718, where the DSP/VG combination is removed before the process ends (step 736). If the process determines in step 712 that the country is part of a jurisdiction, it proceeds with checking whether the verification check is part of a is jurisdiction (step 714). If the verification check is not part of a jurisdiction, the process moves to step 718 and ends as described above. If the verification check is part of a jurisdiction, the process continues by checking if the DSP is the last DSP in that jurisdiction (step 716). If the DSP is not the last DSP in that jurisdiction, the process moves to step 718 and ends as described above. If the DSP is the last DSP in the jurisdiction, then the remove operation is not allowed (i.e., the operation fails). However, the failed operation can be overridden by removing the country from the jurisdiction (step 722), by removing the verification check from the jurisdiction (step 724), or both. Steps 720, 722 and 724 can also occur as a result of an attempt to remove a DSP from a verification check, which will now be discussed.

When a DSP is to be removed from a verification check, the process starts by examining whether the verification check that contains the DSP is part of any jurisdiction (step 704). If the verification check is not part of a jurisdiction, the DSP is removed from the verification check (step 708) and the process ends (step 736). If the verification check is part of a jurisdiction, the process proceeds with checking whether the DSP is the last DSP for any active country (step 706). If the DSP is not the last DSP for any active country, the process proceeds to step 708, as described above. However, if the DSP is the last DSP for an active country, then the same three things that were discussed above may happen, that is, the country has to be removed from the jurisdiction (step 722), the verification check has to be removed from the jurisdiction (step 724), or the operation fails (step 720).

If the country has to be removed from the jurisdiction (step 722), which also corresponds to entry point #3 of the flowchart, the process continues by selecting the country and jurisdiction combination (step 732). An expire command is then issued (step 734) to remove the country from the jurisdiction, and the process ends (step 736).

If the verification check has to be removed from the jurisdiction (step 724), which also corresponds to entry point #4 of the flowchart, the process continues by checking if the weight for that verification check is equal to 0% (step 726), which is a necessary condition for removing a verification check from a jurisdiction. If the weight is greater than 0%, then the process adjusts the weight for the verification check to be 0% and readjusts the weights for the other verification checks to compensate for the first adjustment (step 730). When this is done, the process rennin to step 726. As soon as an affirmative answer is obtained in step 726, the verification check is removed from the jurisdiction (step 728), and the process ends (step 736).

The following describes examples of score tasks. The verification module allows an operator to determine what score is assigned to each result code. After a DSP performs a verification check (for example, age), the DSP returns a result code, which is then mapped to a score. Each DSP can be handled differently regarding how result codes are mapped to scores. (Some DSP's result codes are used directly, where others are translated.) The mapped score represents the operator's interpretation of that DSP's result code.

The mapping of DSP result codes to scores can be defined. The DSPs provide an array of result codes that describe how accurately the information the verification module provided to the DSP matched the DSP records. By assigning a single score to a single result code, an operator can define the acceptance (and confidence) level for each result.

In one implementation, the location check, for example, uses seven internally defined result codes. Each result code represents, a unique combination of the data obtained from GeoPoint. When using VerifyME as a DSP for the age check and residence check, the verification module uses result codes returned directly from VerifyME rather than translating the VerifyME response into an internally defined result code. When using Experian as a DSP, the result codes returned from Experian are mapped to a score. The financial institution check does not call a DSP, but contains 14 internally defined result codes that are map to a score. The risk check uses CyberSource's IFS as a DSP. IFS returns either an invalid card message or a risk score. Both risk scores and the invalid card message are translated into configurable result codes.

The verification module allows an operator to assign weights to each verification check in a given jurisdiction. Operators can fine-tune the settings of the verification checks by selecting the weights assigned to each of the verification checks in a jurisdiction. This feature allows operators to meet the specific objectives for that jurisdiction. Weighting (expressed as, e.g., percentages) can be allocated among the verification checks.

In one implementation, the minimum required score for a given verification check can be defined. Verification checks are independent. If any of them fail, then the verification process stops. If any of the checks return a score that is below the minimum required score, the verification process also stops. The minimum required score is defined as the score that must be met or surpassed for a given verification check for the player to pass the check.

The minimum accepted score for a given verification check can be defined. The minimum accepted score can be set by default or from operator input. This value dictates the minimum value that must be met or exceeded in order for a result from a DSP to be considered for verification without having to call the next highest priority DSP from the verification check.

In one implementation, verification checks can be given a priority order in which they are called during a verification check. Each DSP can be assigned a priority number. The priority number determines the order in which the verification checks are performed for a given jurisdiction. The order can be determined by analyzing the value of the input integer, with the lowest value equaling the highest priority. Table 11 shows an example of a verification check order. In this example, the face value check is first, and its priority is not configurable by an operator.

TABLE 11

| Check Name | Priority No. |
|---|---|
| Face Value | N/A |
| Location | 1 |
| Financial Institution | 2 |
| Age | 3 |
| Residence | 4 |
| Risk | 5 |

The verification score matrix, such as the one shown in Table 1, can be configured. The verification module calculates the total weighted score of all of the verification checks, and returns an evaluation of that player. This evaluation of eligibility is expressed in terms of defined verification action codes: accept (ACP), reject ("REJ"), or manual verification required ("MVF"). The range of verification scores can be adjusted to obtain different evaluation results.

Figure 8:
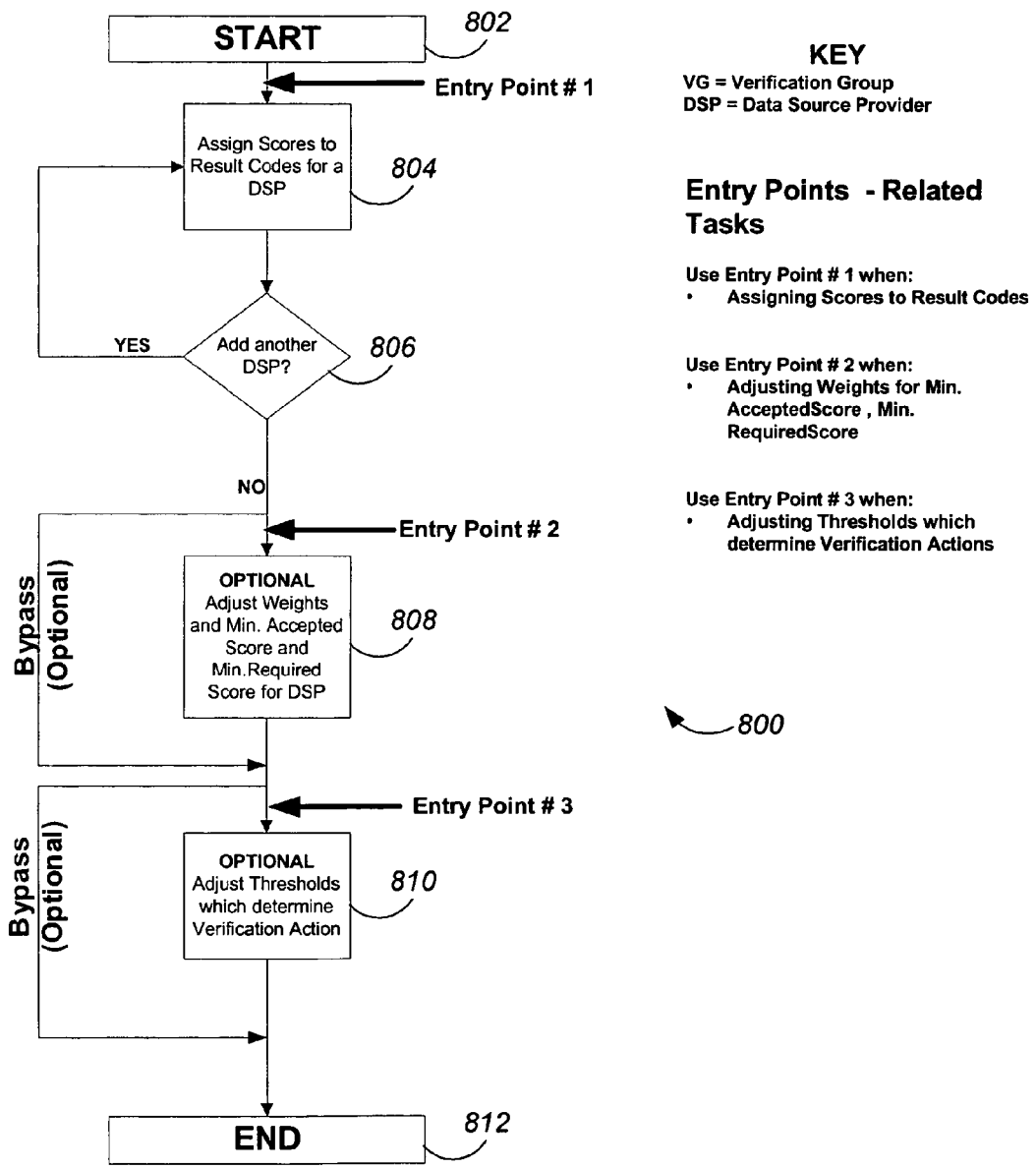
FIG. 8 shows a method for fine tuning the verification module.

Configuration can include line tuning. The verification module allows an operator to fine tune the scores assigned to result codes for a DSP, the minimum score accepted, the minimum score required for a DSP, or adjust the weights for a given verification check to which a number of DSPs are assigned. FIG. 8 shows an example method for fine tuning.

FIG. 8 shows a process 800 for fine tuning scores for DSP results. Again there is a number of different possible entry points. Entry point #1. Entry point #2, and Entry point #3, depending on which scores are to be fine tuned. Entry point #1, which is located just before step 804 is used when scores are to be assigned to result codes. Entry point #2, which is located just before step 808 is used when weights are to be adjusted for minimum accepted score and minimum required score. Entry point #3, which is located just before step 810 is used thresholds for determining verification actions are to be adjusted.

If scores are to be assigned to result codes, the process starts at step 804, where the scores are assigned to result codes for a particular DSP. The process then checks whether another DSP is to be added (step 806). If another DSP is to be added, the process returns to step 804 and continues to loop through steps 804 and 806 until all DSPs have been added. When the process determines in step 806 that no further DSP is to be added, the process can either end (step 812) or adjust weights or threshold values, as will be described below.

If weights are to be adjusted for minimum accepted score and minimum required score, the process starts (or continues) at step 808, where the weights, the minimum accepted score, and the minimum required score is adjusted. Again, the process can then either end (step 812) or proceed by adjusting threshold values that determine verification actions (step 810) before ending. Step 810 is also the starting point if the only desired action of the process is to adjust threshold values that determine verification actions. This completes the fine tuning process 800.

Figure 9A:
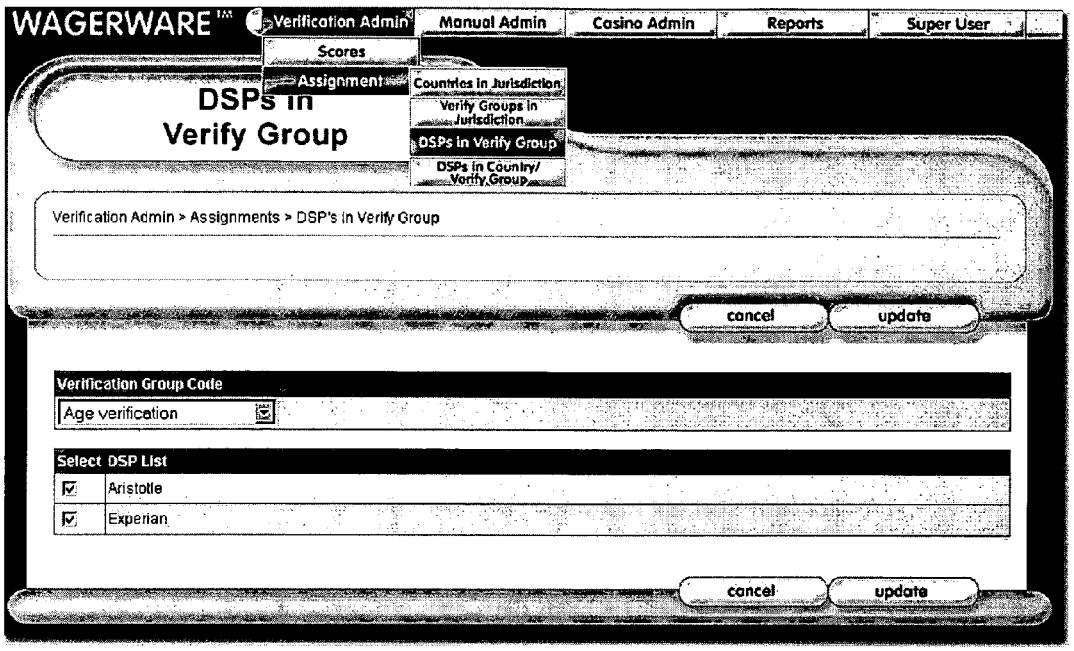
Figure 9B:
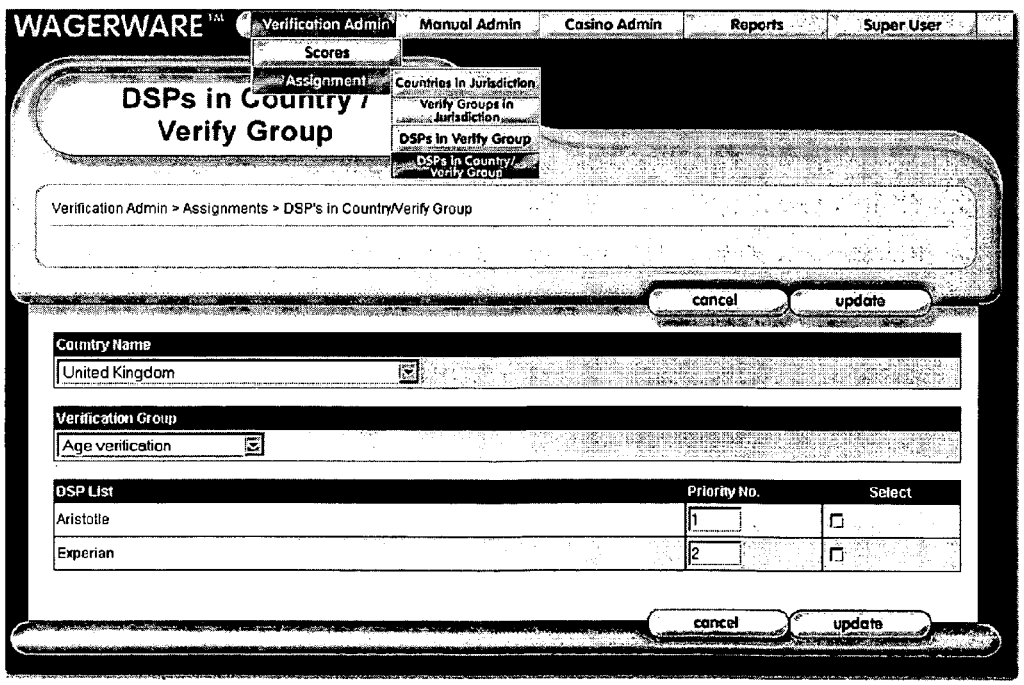
Figures 9C, 9D:
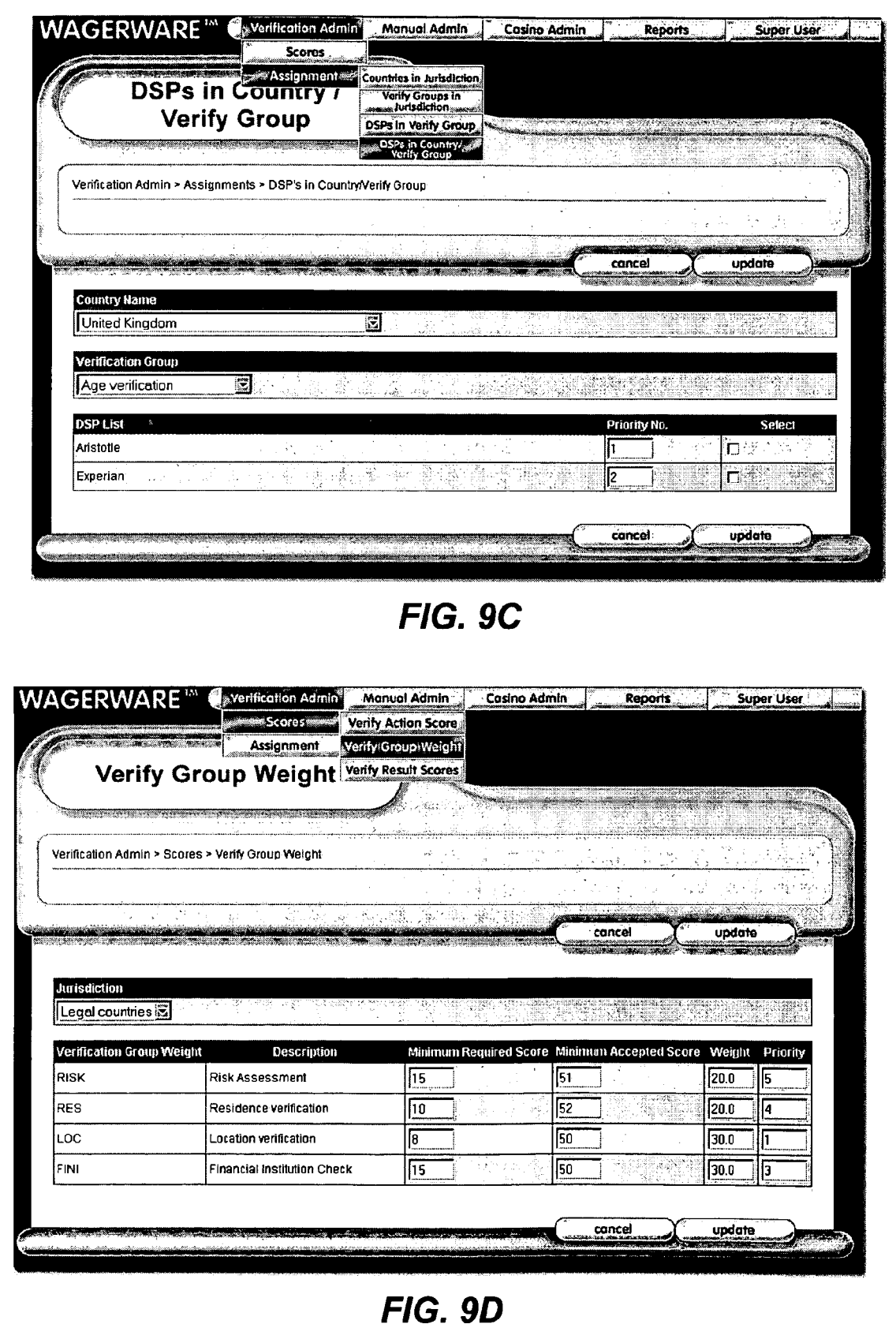
Figure 9E:
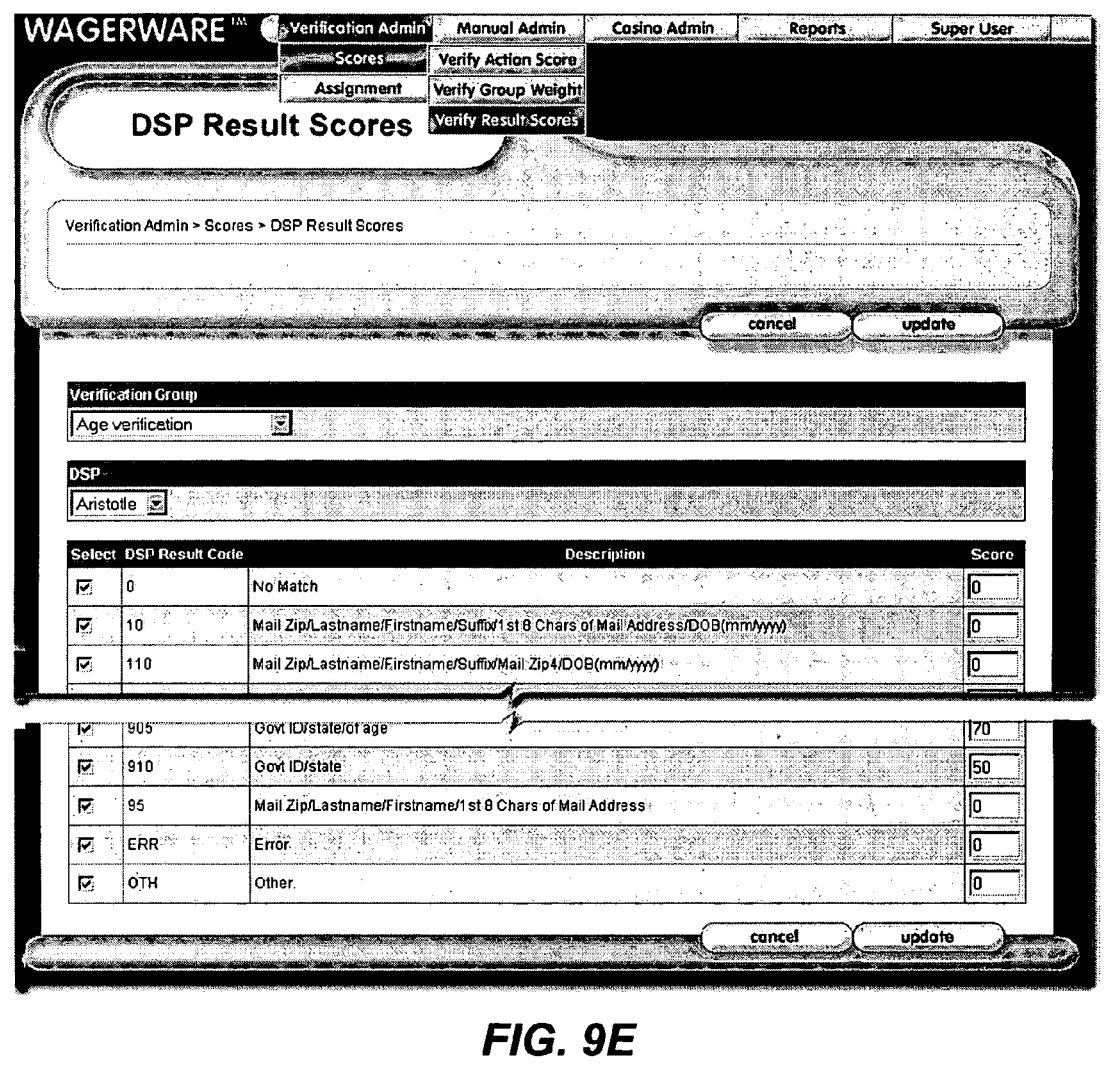
Figure 9F:
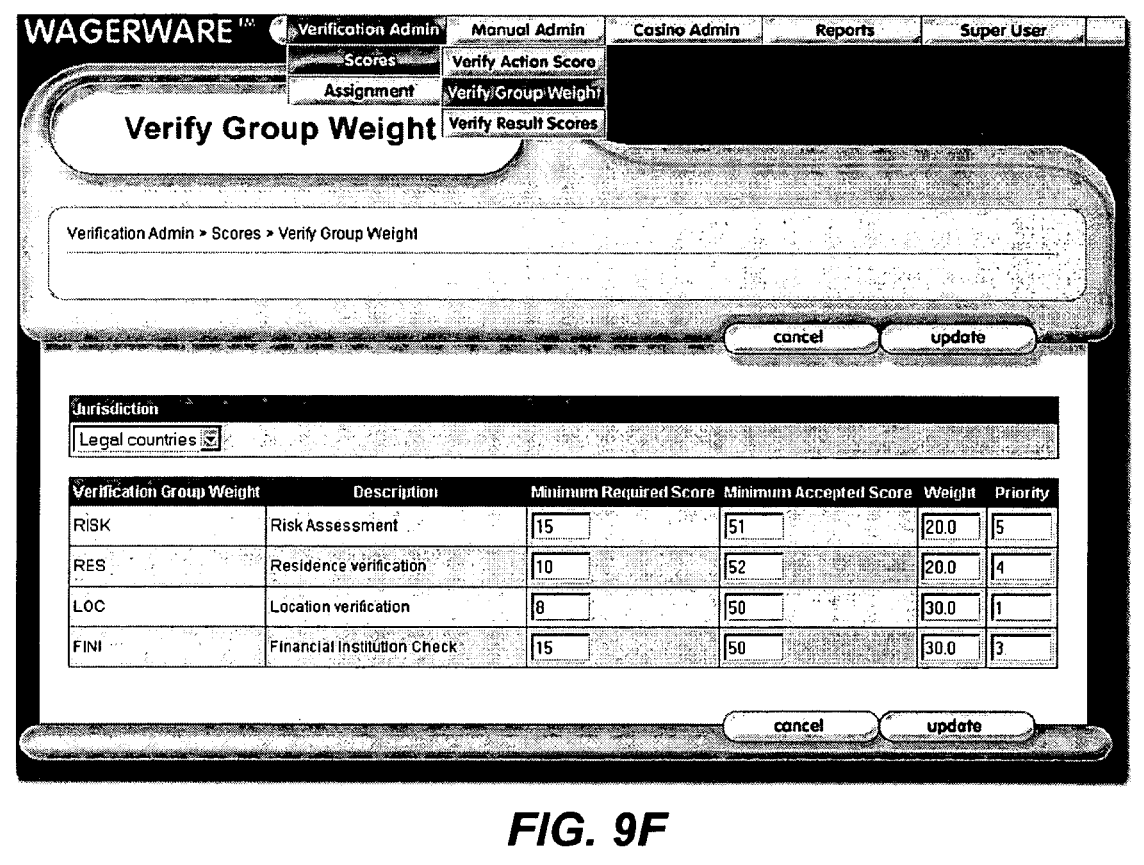

FIG. 9A-F show examples of a user interface for configuring the verification module. FIG. 9A shows the user interface being used to assign a DSP to a verification check. FIG. 9B shows the user interface being used to assign a country to a DSP/verification, check combination. FIG. 9C shows the user interface being used to prioritized DSPs for a verification check. FIG. 9D shows the user interface being used to assign weights to verification checks. FIG. 9E shows the user interface being used to fine tune scores. FIG. 9F shows the user interface being used to set define the minimum score required.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of data processing apparatus, e.g., a programmable processor, a computer, or multiple computers. A computer program can be written in any form of programming language, including compiled or interpreted languages, and it can be deployed in any form, including as a stand-alone program or as a verification module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results. The verification module can use any data source providers and is not limited to the examples described. For example, the verification module can obtain longitude and latitude information from a data source that uses GPS to locate a user. The verification module can support other e-commerce applications and is not limited to supporting on-line gaming applications. For example, the verification module can verify user information for on-line banking applications, such as loan processing and financing.

What is claimed is:

1. A non-transitory computer readable media with computer-executable instructions embodied thereon for configuring a verification system for determining eligibilities of players to participate in online gaming on an online gaming system that, when executed by a processor, cause the processor to:
add a new data source provider for performing a verification check, wherein the new data source provider provides data to confirm personal information of the players to the online gaming system for performing the verification check;
adjust a minimum result score needed for the player to pass the verification check based on the new data service provider being added to the verification check;
enable the verification check and the new data source provider for a country where online gaming is allowed; and
verify an eligibility of a plurality of players attempting to participate in online gaming on the online gaming system, including:
receiving identification information provided by a player of the plurality of players attempting to participate in online gaming on the online gaming system, and
determining the player is located in the country, and
performing the verification check, including requesting data about the player from the new data source provider.

2. The media of claim 1, further including instructions that cause the processor to add the country to a jurisdiction, wherein the jurisdiction includes a plurality of countries.

3. The media of claim 2, further including instructions that cause the processor to determine whether each of the plurality of countries has an associated data source provider to perform the verification check.

4. The media of claim 3, further including instructions that cause the processor to associate the new data source provider for any countries within the jurisdiction that do not have an associated data source provider.

5. The media of claim 3, further including instructions that cause the processor to enable the verification check for each of the plurality of counties within the jurisdiction.

6. The media of claim 1, further including instructions that cause the processor to calculate a result score of the player based on the identification information.

7. The media of claim 6, further including instructions that cause the processor to compare the result score with the minimum result score.

8. A non-transitory computer readable media with computer-executable instructions embodied thereon for configuring a verification system for determining a player's eligibility to participate in online gaming on an online gaming system that, when executed by a processor, cause the processor to:
select an existing data source provider for removal from the verification system;
determine a verification check associated with the existing data source provider;
removing the existing data source provider from the verification system;
determine that the verification check is associated with a jurisdiction, wherein the jurisdiction includes a plurality of countries;
determine that the existing data source provider is a last data source provider for at least one of the plurality of countries; and
in response to determining that the existing data source provider is the last data source provider for the at least one of the plurality of countries, select the at least one of the plurality of countries for removal from the jurisdiction.

9. The media of claim 8, further including instructions that cause the processor to issue an expire command in response to selecting the at least one of the plurality of countries for removal.

10. The media of claim 8, further including instructions that cause the processor to select the verification check for removal from the jurisdiction.

11. The media of claim 9, further including instructions that cause the processor to determine whether a weight for the verification check is equal to zero percent in the jurisdiction.

12. The media of claim 11, further including instructions that cause the processor to determine that the weight for the verification check is not equal to zero percent, and in response, adjust the weight of the verification check to be zero percent.

13. The media of claim 11, further including instructions that cause the processor to determine that the weight for the verification check is equal to zero percent, and in response, remove the verification check from the jurisdiction.

14. A method of configuring a verification system for determining eligibilities of players to participate in online gaming on an online gaming system in a gaming server, the method comprising:
adding a new data source provider for performing a verification check, wherein the new data source provider provides data to the gaming server to confirm personal information of the players to the gaming server for performing the verification check;
adjusting a minimum result score needed for the player to pass the verification check based on the new data service provider being added to the verification check;
enabling the verification check and the new data source provider for a country where online gaming is allowed; and
verifying an eligibility of a plurality of players attempting to participate in online gaming on the online gaming system, including:
receiving, at the gaming server, identification information provided by a player of the plurality of players attempting to participate in online gaming through the gaming server,
determining the player is located in the country, and
performing the verification check, including requesting data about the player from the new data source provider.

15. The method of claim 14, further comprising adding the country to a jurisdiction, wherein the jurisdiction includes a plurality of countries.

16. The method of claim 15, further comprising determining whether each of the plurality of countries has an associated data source provider to perform the verification check.

17. The method of claim 16, further comprising associating the new data source provider for any countries within the jurisdiction that do not have an associated data source provider.

18. The method of claim 16, further comprising enabling the verification check for each of the plurality of counties within the jurisdiction.

19. The method of claim 14, further comprising calculating a result score of the player based on the identification information.

20. The method of claim 19, further comprising comparing the result score with the minimum result score.

21. A non-transitory computer readable media with computer-executable instructions embodied thereon for configuring a verification system for determining a player's eligibility to participate in online gaming on an online gaming system that, when executed by a processor, cause the processor to:
- add a new data source provider for performing a verification check, wherein the data source provider provides data to confirm a personal information of the player;
- adjust a minimum result score needed for the player to pass the verification check based on the new data service provider;
- enable the verification check and the new data source provider for a country where online gaming is allowed;
- add the country to a jurisdiction, wherein the jurisdiction includes a plurality of countries; and
- verify an eligibility of a plurality of players attempting to participate in online gaming on the online gaming system, the plurality of players including the player, the verifying the eligibility including:
  - receiving identification information provided by the player;
  - determining the player is located in the country; and
  - performing the verification check.

22. The media of claim 21, further including instructions that cause the processor to determine whether each of the plurality of countries has an associated data source provider to perform the verification check.

23. The media of claim 22, further including instructions that cause the processor to associate the new data source provider for any countries within the jurisdiction that do not have an associated data source provider.

24. The media of claim 22, further including instructions that cause the processor to enable the verification check for each of the plurality of counties within the jurisdiction.

25. The media of claim 21, further including instructions that cause the processor to calculate a result score of the player based on the identification information.

26. The media of claim 25, further including instructions that cause the processor to compare the result score with the minimum result score.

27. A method of configuring a verification system for determining a player's eligibility to participate in online gaming on an online gaming system in a gaming server, the method comprising:
- adding a new data source provider for performing a verification check, wherein the data source provider provides data to the gaming server to confirm a personal information of the player;
- adjusting a minimum result score needed for the player to pass the verification check based on the new data service provider;
- enabling the verification check and the new data source provider for a country where online gaming is allowed;
- adding the country to a jurisdiction, wherein the jurisdiction includes a plurality of countries; and
- verifying an eligibility of a plurality of players attempting to participate in online gaming on the online gaming system, the plurality of players including the player, the verifying the eligibility including:
  - receiving, at the gaming server, identification information provided by the player;
  - determining the player is located in the country; and
  - performing the verification check.

28. The method of claim 27, further comprising determining whether each of the plurality of countries has an associated data source provider to perform the verification check.

29. The method of claim 28, further comprising associating the new data source provider for any countries within the jurisdiction that do not have an associated data source provider.

30. The method of claim 28, further comprising enabling the verification check for each of the plurality of counties within the jurisdiction.

31. The method of claim 27, further comprising calculating a result score of the player based on the identification information.

32. The method of claim 31, further comprising comparing the result score with the minimum result score.

* * * * *